(12) United States Patent
Morimoto et al.

(10) Patent No.: US 9,140,459 B2
(45) Date of Patent: Sep. 22, 2015

(54) HEAT PUMP DEVICE

(75) Inventors: Hiroyuki Morimoto, Tokyo (JP); Koji Yamashita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 282 days.

(21) Appl. No.: 13/880,191

(22) PCT Filed: Dec. 7, 2010

(86) PCT No.: PCT/JP2010/007097
§ 371 (c)(1),
(2), (4) Date: Apr. 18, 2013

(87) PCT Pub. No.: WO2012/077156
PCT Pub. Date: Jun. 14, 2012

(65) Prior Publication Data
US 2013/0205824 A1    Aug. 15, 2013

(51) Int. Cl.
*F25B 27/00* (2006.01)
*F24F 3/06* (2006.01)
(Continued)

(52) U.S. Cl.
CPC . *F24F 3/065* (2013.01); *F24D 3/08* (2013.01); *F24D 5/04* (2013.01); *F24D 5/12* (2013.01); *F24D 19/1054* (2013.01); *F24F 3/06* (2013.01); *F24F 5/0096* (2013.01); *F24H 4/02* (2013.01); *F24H 4/04* (2013.01); *F24H 6/00* (2013.01); *F25B 7/00* (2013.01); *F25B 13/00* (2013.01); *F25B 25/005* (2013.01); *F25B 30/02* (2013.01); *F24D 2200/123* (2013.01); *F24F 2221/34* (2013.01); *F24F 2221/54* (2013.01); *F25B 2313/006* (2013.01); *F25B 2313/023* (2013.01);
(Continued)

(58) Field of Classification Search
CPC .......... F25B 13/00; F25B 41/046; F25B 9/00; Y02B 30/123
USPC ....................... 62/222, 238.7, 324.6, 468, 498
See application file for complete search history.

(56) References Cited

U.S. PATENT DOCUMENTS 4,598,557 A * 7/1986 Robinson et al. ............. 62/238.6
7,350,366 B2 * 4/2008 Yakumaru et al. .............. 62/116
(Continued)

FOREIGN PATENT DOCUMENTS

JP    61-101771 A    5/1986
JP    05-280818 A    10/1993
(Continued)

OTHER PUBLICATIONS

Office Action mailed Feb. 18, 2014 issued in corresponding JP patent application No. 2012-547596 (and English translation).
(Continued)

*Primary Examiner* — Melvin Jones
(74) *Attorney, Agent, or Firm* — Posz Law Group, PLC

(57) ABSTRACT

A heat pump device heats a second heat medium to a high temperature with high efficiency by using a secondary-loop refrigeration cycle while achieving a cooling operation and a heating operation simultaneously in a state where reliability and efficiency are ensured.
In a heat pump device, a heat medium relay unit and a water heating unit are each provided with two connection ports that are connectable to refrigerant pipes, a refrigerant circuit and a refrigerant circuit are connected to each other via a heat exchanger included in the water heating unit, and a second heat medium is heated in a heat exchanger.

9 Claims, 9 Drawing Sheets

(51) Int. Cl.
  *F25B 7/00* (2006.01)
  *F25B 13/00* (2006.01)
  *F25B 25/00* (2006.01)
  *F24H 4/02* (2006.01)
  *F25B 30/02* (2006.01)
  *F24F 5/00* (2006.01)
  *F24H 4/04* (2006.01)
  *F24H 6/00* (2006.01)
  *F24D 3/08* (2006.01)
  *F24D 5/04* (2006.01)
  *F24D 5/12* (2006.01)
  *F24D 19/10* (2006.01)

(52) U.S. Cl.
  CPC . *F25B 2313/0231* (2013.01); *F25B 2313/0272* (2013.01); *F25B 2313/02732* (2013.01); *F25B 2313/02741* (2013.01); *F25B 2400/121* (2013.01)

(56) References Cited

U.S. PATENT DOCUMENTS

| | | | | |
|---|---|---|---|---|
| 2005/0066678 | A1* | 3/2005 | Kamimura | 62/238.7 |
| 2012/0180510 | A1* | 7/2012 | Okazaki et al. | 62/218 |
| 2012/0266678 | A1* | 10/2012 | Domke et al. | 73/642 |

FOREIGN PATENT DOCUMENTS

| | | |
|---|---|---|
| JP | 2001-289465 A | 10/2001 |
| JP | 2003-343936 A | 12/2003 |
| JP | 2004-003801 A | 1/2004 |
| JP | 2005-140444 A | 6/2005 |
| JP | 2010-196952 A | 9/2010 |
| WO | 2010/049998 A1 | 5/2010 |
| WO | 2010/113372 A1 | 10/2010 |
| WO | 2010/131378 A1 | 11/2010 |

OTHER PUBLICATIONS

International Search Report of the International Searching Authority mailed Jan. 25, 2011 for the corresponding international application No. PCT/JP2010/007097 (with English translation).

* cited by examiner

HEAT PUMP DEVICE

CROSS REFERENCE TO RELATED APPLICATION

This application is a U.S. national stage application of PCT/JP2010/007097 filed on Dec. 7, 2010.

TECHNICAL FIELD

The present invention relates to heat pump devices applied to, for example, multi-air-conditioning apparatuses for buildings.

BACKGROUND ART

With regard to heat pump devices in the related art such as multi-air-conditioning apparatuses for buildings, a refrigerant is made to circulate between an outdoor unit serving as a heat source unit disposed outside an architectural structure and indoor units disposed inside the architectural structure, for example. The refrigerant transfers heat or receives heat so that an air-conditioned space is cooled or heated by cooled air or heated air. An example of a refrigerant commonly used in such a heat pump device is an HFC (hydrofluorocarbon) based refrigerant. The use of a natural refrigerant, such as carbon dioxide ($CO_2$), has also been proposed.

In a heat pump device called a chiller, cooling energy or heating energy is generated in the heat source unit disposed outside the architectural structure. A heat medium, such as water or antifreeze, is heated or cooled by a heat exchanger disposed within the outdoor unit and is transported to a fan coil unit, a panel heater, a radiator, or the like serving as an indoor unit, thereby performing a cooling operation or a heating operation (for example, see Patent Literature 1).

Another known device called exhaust heat recovery chiller uses four water pipes to connect between the heat source unit and each indoor unit and simultaneously supplies cooled water, heated water, or the like so that a cooling operation or a heating operation can be freely selected in the indoor unit (for example, see Patent Literature 2).

In another known device, a heat exchanger for a first refrigerant and a second refrigerant is disposed near the indoor units, and the second refrigerant is transported to the indoor units (for example, see Patent Literature 3).

In another known device, the outdoor unit and branch units having heat exchangers are connected by two pipes, and the second refrigerant is transported to each indoor unit (for example, see Patent Literature 4).

Furthermore, with regard to heat pump devices such as multi-air-conditioning apparatuses for buildings, there is a heat pump device that makes the refrigerant circulate from the outdoor unit to a relay unit, and makes the heat medium, such as water, circulate from the relay unit to the indoor units so as to reduce the power for transporting the heat medium while making the heat medium, such as water, circulate to the indoor units (for example, see Patent Literature 5).

CITATION LIST

Patent Literature

Patent Literature 1: Japanese Unexamined Patent Application Publication No. 2005-140444 (p. 4, FIG. 1, etc.)
Patent Literature 2: Japanese Unexamined Patent Application Publication No. 5-280818 (pp. 4 and 5, FIG. 1, etc.)
Patent Literature 3: Japanese Unexamined Patent Application Publication No. 2001-289465 (pp. 5 to 8, FIGS. 1 and 2, etc.)
Patent Literature 4: Japanese Unexamined Patent Application Publication No. 2003-343936 (p. 5, FIG. 1, etc.)
Patent Literature 5: WO 10/049,998 (p. 3, FIG. 1, etc.)

SUMMARY OF INVENTION

Technical Problem

In the heat pump devices in the related art such as multi-air-conditioning apparatuses for buildings, since the refrigerant is made to circulate to each indoor unit, there is a possibility that the refrigerant may leak indoors or the like. On the other hand, in the heat pump devices as discussed in Patent Literature 1 and Patent Literature 2, the refrigerant does not travel through the indoor units. However, in the heat pump devices as discussed in Patent Literature 1 and Patent Literature 2, it is necessary to heat or cool the heat medium in the heat source unit outside the architectural structure and transport the heat medium toward the indoor units. Therefore, the circulation passage for the heat medium is long. If heat used for performing predetermined heating or cooling is to be transported by the heat medium, the amount of energy consumed due to the transporting power or the like becomes higher than that of the refrigerant. Therefore, if the circulation passage is long, the transporting power becomes extremely large. In view of this, in the heat pump devices, it is evident that energy conservation can be achieved if the circulation of the heat medium can be controlled well.

In the heat pump device as discussed in Patent Literature 2, in order to make a cooling operation or a heating operation selectable in each indoor unit, it is necessary to connect four pipes between the outdoor side and the indoor side, resulting in poor constructability. In the heat pump device as discussed in Patent Literature 3, since it is necessary for each indoor unit to have second refrigerant circulating means, such as a pump, the heat pump device not only leads to an expensive system, but also creates loud noise, and is therefore not practical. In addition, since a heat exchanger is disposed near each indoor unit, a risk of the refrigerant leaking in an area near an indoor space cannot be eliminated.

In the heat pump device as discussed in Patent Literature 4, since the first refrigerant (i.e., a heat-source-side refrigerant) after exchanging heat flows into the same passage as that of the first refrigerant before exchanging heat, if a plurality of indoor units are connected, each indoor unit cannot exhibit maximum performance, resulting in an energetically wasteful configuration. Moreover, since each branch unit and an extension pipe are connected by a total of four pipes, that is, two pipes for cooling and two pipes for heating, the configuration is similar to that of a system in which the outdoor unit and the branch units are connected by four pipes, resulting in a system with poor constructability.

In the heat pump device as discussed in Patent Literature 5, a plurality of refrigerant-heat medium heat exchangers are provided so that cold water and hot water can be simultaneously generated without having to introduce the refrigerant directly indoors. However, high-temperature water used for hot water supply cannot be generated.

If connecting to panel heaters, radiators, or the like, because they do not have fans, as in fan coils, and perform heat transfer by natural retention and radiation, the heat transfer performance thereof is lower than that of fan coils. As a result, it is necessary to cope with this by increasing the water temperature (i.e., the temperature of the heat medium) to a 70° C. level. However, a water temperature that can be achieved with a primary-loop refrigeration cycle while ensuring efficiency and reliability is limited to about 55° C. Furthermore, since hot-water generation by using a boiler is not efficient from the viewpoint of global warming prevention in recent years, there have been strong demands for replacing it with a highly efficient refrigeration cycle.

The present invention has been made to solve at least one of the aforementioned problems, and an object thereof is to provide a heat pump device that can achieve energy conservation. Another object of the present invention is to provide a heat pump device that can achieve improved safety by not making a refrigerant circulate to indoor units or the vicinity of the indoor units. Another object of the present invention is to provide a heat pump device that achieves high constructability and allows for high energy efficiency by reducing the number of connection pipes between an outdoor unit and a branch unit (i.e., a heat medium relay unit) or indoor units. Another object of the present invention is to provide a heat pump device that heats a second heat medium to a high temperature with high efficiency by using a secondary-loop refrigeration cycle while achieving a cooling operation and a heating operation simultaneously in a state where reliability and efficiency are ensured.

Solution to Problem

A heat pump device according to the present invention includes a first refrigerant circuit that makes a first refrigerant circulate therethrough by connecting a first compressor, a heat-source-side heat exchanger, a first expansion device, a first on-off device, and a refrigerant-side passage in a heat exchanger related to heat medium with a refrigerant pipe; a first heat medium circuit that makes a first heat medium circulate therethrough by connecting a pump, a use-side heat exchanger, a heat-medium-side passage in the heat exchanger related to heat medium with a heat medium pipe; a second refrigerant circuit that makes a second refrigerant circulate therethrough by connecting a second compressor, a first heat exchanger, a second expansion device, and a second heat exchanger with a refrigerant pipe; and a second heat medium circuit that makes a second heat medium circulate therethrough, the second heat medium exchanging heat with the second refrigerant via the first heat exchanger. The first compressor and the heat-source-side heat exchanger are included in an outdoor unit. The first expansion device, the first on-off device, the heat exchanger related to heat medium, and the pump are included in a heat medium relay unit. The use-side heat exchanger is included in an indoor unit. The second compressor, the first heat exchanger, the second expansion device, and the second heat exchanger are included in a water heating unit. The first refrigerant circuit and the second refrigerant circuit are connected to each other via the second heat exchanger included in the water heating unit, and the first heat exchanger is capable to heat the second heat medium.

Advantageous Effects of Invention

With the heat pump device according to the present invention, the pipe through which the heat medium circulates is shortened so that the transporting power therefor can be reduced, whereby energy conservation can be achieved. Furthermore, with the heat pump device according to the present invention, even if the heat medium leaks outward, the amount thereof is minimized, thereby allowing for improved safety. Furthermore, with the heat pump device according to the present invention, high constructability can be achieved. Furthermore, with the heat pump device according to the present invention, since the second refrigerant circuit is provided, a secondary-loop refrigeration cycle can be formed, thereby heating the second heat medium to a high temperature with high efficiency while achieving a cooling operation and a heating operation simultaneously in a state where reliability and efficiency are ensured.

DESCRIPTION OF EMBODIMENTS

Embodiments of the present invention will be described below with reference to the drawings.

Embodiment 1

Figure 1:
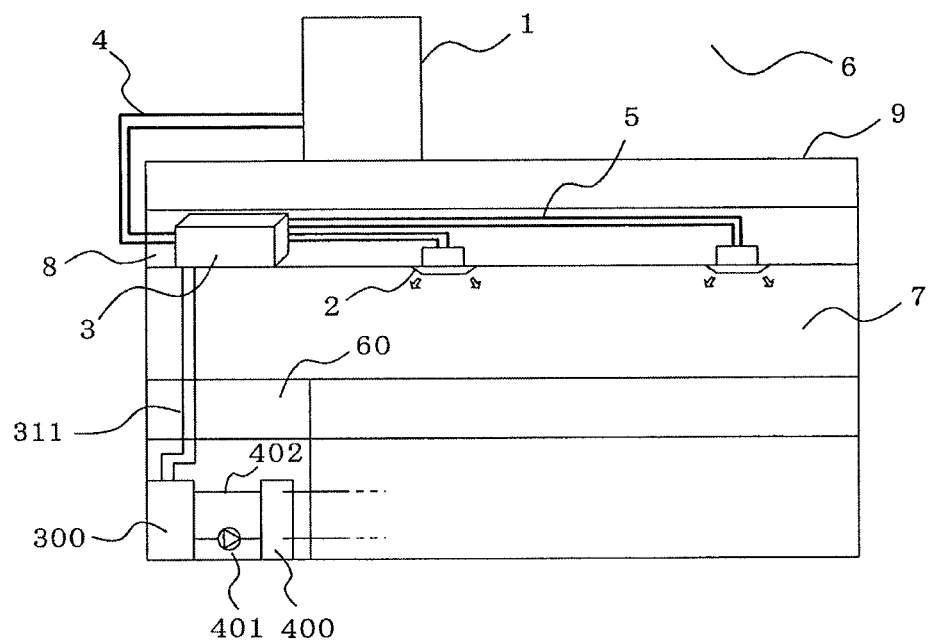
FIG. 1 is a schematic diagram illustrating an installation example of a heat pump device according to Embodiment 1 of the present invention.

FIG. 1 is a schematic diagram illustrating an installation example of a heat pump device according to Embodiment 1 of the present invention. The installation example of the heat pump device according to Embodiment 1 will be described with reference to FIG. 1. This heat pump device utilizes refrigeration cycles (i.e., a refrigerant circuit A (i.e., a first refrigerant circuit), a heat medium circuit B (i.e., a first heat medium circuit), and a refrigerant circuit C (i.e., a second refrigerant circuit)) through which refrigerants (i.e., a heat-source-side refrigerant (i.e., a first refrigerant) and a heat medium (i.e., a first heat medium)) flow so as to allow each indoor unit to freely select a cooling mode or a heating mode as an operation mode and also to allow for supply of high-temperature water via a hot-water supply device. In the following drawings, including FIG. 1, the dimensional relationship among components may sometimes be different from that in actuality.

In FIG. 1, the heat pump device according to Embodiment 1 has a single outdoor unit 1 serving as a heat source unit, a plurality of indoor units 2, a water heating unit 300, a heat medium relay unit 3 intervening the outdoor unit 1 and load-side units (i.e., the indoor units 2 and the water heating unit 300), and a hot-water storage tank 400 connected to the water heating unit 300. The water heating unit 300 and the hot-water storage tank 400 are connected to each other by pipes (i.e., heat medium pipes) 402 through which water (i.e., a second heat medium) flows, and a water transport unit 401 for circulating the water is attached to one of the pipes 402.

The heat medium relay unit 3 exchanges heat between the heat-source-side refrigerant and the first heat medium that is different from this heat-source-side refrigerant. The water heating unit 300 exchanges heat between the heat-source-side refrigerant and a water-heating-unit-side refrigerant (i.e., a second refrigerant). The outdoor unit 1 and the water heating unit 300 constitute a so-called binary cycle (cascade cycle). The outdoor unit 1 and the heat medium relay unit 3 are connected to each other by refrigerant pipes 4 through which the heat-source-side refrigerant flows. The heat medium relay unit 3 and the indoor units 2 are connected to each other by pipes (i.e., heat medium pipes) 5 through which the first heat medium flows. The water heating unit 300 has a parallel relationship with heat exchangers 15 related to heat medium, to be described later, and is connected to the heat medium relay unit 3 by refrigerant pipes 311 through which the heat-source-side refrigerant flows. Cooling energy or heating energy generated in the outdoor unit 1 is distributed to the indoor units 2 and the water heating unit 300 via the heat medium relay unit 3.

The outdoor unit 1 is disposed in an outdoor space 6 (e.g., the rooftop) of an architectural structure 9, such as a building, and supplies cooling energy or heating energy to the indoor units 2 via the heat medium relay unit 3. The indoor units 2 are disposed where they can supply cooling air or heating air to an indoor space 7, which is a space (e.g., an accommodation room) inside the architectural structure 9, and supply cooling air or heating air to the indoor space 7 as an air-conditioned space. The water heating unit 300, the hot-water storage tank 400, and the water transport unit 401 are installed in a space (e.g., a mechanical room 60) inside the architectural structure 9, such as a building, and high-temperature water is stored in the hot-water storage tank 400. The installation position of the water heating unit 300 is not limited to the mechanical room 60 and may be located in the outdoor space 6, on the rooftop, or the like.

The heat medium relay unit 3 can be installed at a separate location from the outdoor space 6 and the indoor space 7 with having an independent housing from the outdoor unit 1, the indoor units 2, and the water heating unit 300, and is connected to the outdoor unit 1 and the indoor units 2 by the refrigerant pipes 4 and the pipes 5 respectively so as to transfer the cooling energy or the heating energy supplied from the outdoor unit 1 to the indoor units 2. Furthermore, the heat medium relay unit 3 is connected to the water heating unit 300 by the refrigerant pipes 311 so as to transfer the cooling energy or the heating energy supplied from the outdoor unit 1 to the water heating unit 300.

As shown in FIG. 1, in the heat pump device according to Embodiment 1, the outdoor unit 1 and the heat medium relay unit 3 are connected with two refrigerant pipes 4, the heat medium relay unit 3 and each indoor unit 2 are connected with two pipes 5, and the heat medium relay unit 3 and the water heating unit 300 are connected with two refrigerant pipes 311. Accordingly, in the heat pump device according to Embodiment 1, the units (i.e., the outdoor unit 1, the indoor units 2, and the heat medium relay unit 3) are connected with pairs of pipes (i.e., the refrigerant pipes 4 and the pipes 5), thereby facilitating the construction process. Moreover, by providing the heat medium relay unit 3 close to the indoor units 2, the pipes in the circuit (i.e., the heat medium circuit B) through which the first heat medium circulates can be shortened. Consequently, the power for transporting the first heat medium can be reduced, thereby achieving energy conservation.

FIG. 1 illustrates an example in which the heat medium relay unit 3 is installed in a space above a ceiling, etc. (simply referred to as "space 8" hereinafter), which is a space inside the architectural structure 9 but separated from the indoor space 7. Alternatively, the heat medium relay unit 3 may be installed in, for example, a common space in which an elevator or the like is provided. Furthermore, although FIG. 1 illustrates an example in which the indoor units 2 are of a ceiling cassette type, the indoor units 2 are not limited to this type and may be of any type, such as a ceiling concealed type or a ceiling suspended type, which can blow heating air or cooling air to the indoor space 7 directly or via ducts, etc.

Although FIG. 1 illustrates an example in which the outdoor unit 1 is installed in the outdoor space 6, the invention is not limited to this example. For example, the outdoor unit 1 may be installed in a surrounded space, such as a mechanical room equipped with a ventilating hole, may be installed inside the architectural structure 9 so long as the waste heat can be exhausted outward from the architectural structure 9 via an exhaust duct, or may be installed inside the architectural structure 9 if the outdoor unit 1 used is of a water-cooled type. Installing the outdoor unit 1 in such places would not lead to particular problems. Furthermore, although an example in which the water heating unit 300 is connected to the hot-water storage tank 400 is illustrated, the water heating unit 300 may alternatively be connected to a panel heater or a radiator.

Although FIG. 1 illustrates an example in which the outdoor unit 1 is installed in the outdoor space 6, the invention is not limited to this example. For example, the outdoor unit 1 may be installed in a surrounded space, such as a mechanical room equipped with a ventilating hole, may be installed inside the architectural structure 9 so long as the waste heat can be exhausted outward from the architectural structure 9 via an exhaust duct, or may be installed inside the architectural structure 9 if the outdoor unit 1 used is of a water-cooled type. Installing the outdoor unit 1 in such places would not lead to particular problems.

Furthermore, the heat medium relay unit 3 may alternatively be installed in the vicinity of the outdoor unit 1. However, since the power for transporting the first heat medium would significantly increase if the distance from the heat medium relay unit 3 to the indoor units 2 is too long, it should be noted that an energy conservation effect would be reduced. Moreover, the connected number of the outdoor unit 1, the indoor units 2, the water heating unit 300, and the heat medium relay unit 3 is not limited to that shown in FIG. 1, but may be set in accordance with the architectural structure 9 in which the heat pump device according to Embodiment 1 is installed.

Figure 2:
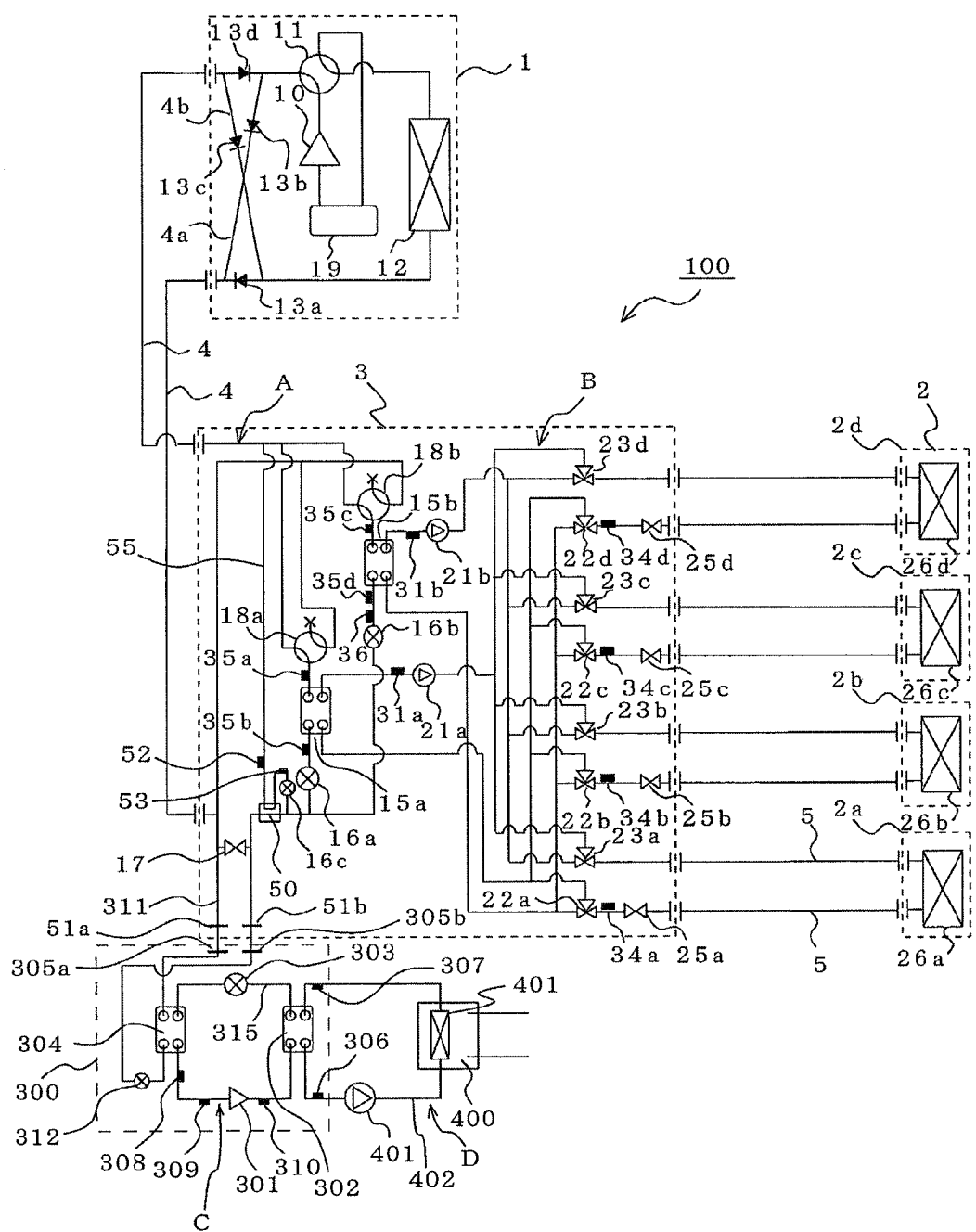
FIG. 2 is a schematic circuit configuration diagram showing an example of a circuit configuration of the heat pump device according to Embodiment 1 of the present invention.

FIG. 2 is a schematic circuit configuration diagram showing an example of a circuit configuration of the heat pump device (referred to as "heat pump device 100" hereinafter) according to Embodiment 1. The circuit configuration of the heat pump device 100 will be described in detail with reference to FIG. 2. As shown in FIG. 2, the outdoor unit 1 and the heat medium relay unit 3 are connected to each other by the refrigerant pipes 4 via a heat exchanger 15a related to heat medium and a heat exchanger 15b related to heat medium included in the heat medium relay unit 3. Moreover, the heat medium relay unit 3 and the indoor units 2 are connected to each other by the pipes 5 via the heat exchanger 15a related to heat medium and the heat exchanger 15b related to heat medium. The water heating unit 300 and the outdoor unit 1 are connected to each other by the refrigerant pipes 311, which branch off from sections of the refrigerant pipes 4. Detailed descriptions of the pipes (i.e., the refrigerant pipes 4, the refrigerant pipes 311, the pipes 5, and the pipes 402) will be provided later.

[Outdoor Unit 1]

The outdoor unit 1 is equipped with a compressor (i.e., a first compressor) 10, a first refrigerant flow switching device 11, such as a four-way valve, a heat-source-side heat exchanger 12, and an accumulator 19 that are connected in series by the refrigerant pipes 4. Furthermore, the outdoor unit 1 is provided with a first connection pipe 4a, a second connection pipe 4b, a check valve 13a, a check valve 13b, a check valve 13c, and a check valve 13d. With the first connection pipe 4a, the second connection pipe 4b, the check valve 13a, the check valve 13b, the check valve 13c, and the check valve 13d, the heat-source-side refrigerant flowing into the heat medium relay unit 3 can be made to flow in the same direction, regardless of operations requested by the indoor units 2.

The compressor 10 suctions the heat-source-side refrigerant and compresses the heat-source-side refrigerant to be in high-temperature high-pressure state, and may be constituted of, for example, a capacity-controllable inverter compressor. The compressor 10 functions as a first compressor that makes the heat-source-side refrigerant circulate through the refrigerant circuit A. The first refrigerant flow switching device 11 switches the flow of the heat-source-side refrigerant during a heating operation (i.e., a heating only operation mode and a heating main operation mode) and the flow of the heat-source-side refrigerant during a cooling operation (i.e., a cooling only operation mode and a cooling main operation mode).

The heat-source-side heat exchanger 12 functions as an evaporator during the heating operation and functions as a condenser (or a radiator) during the cooling operation, and exchanges heat between air supplied from an air-sending device, such as a fan (not shown), and the heat-source-side refrigerant so as to evaporate and gasify the heat-source-side refrigerant or condense and liquefy the heat-source-side refrigerant. The accumulator 19 is provided at the suction side of the compressor 10 and retains excess refrigerant caused by a difference between the heating operation and the cooling operation, or excess refrigerant caused by a change in a transient operation.

The check valve 13d is provided in the refrigerant pipe 4 between the heat medium relay unit 3 and the first refrigerant flow switching device 11 and allows the heat-source-side refrigerant to flow only in a predetermined direction (i.e., a direction from the heat medium relay unit 3 toward the outdoor unit 1). The check valve 13a is provided in the refrigerant pipe 4 between the heat-source-side heat exchanger 12 and the heat medium relay unit 3 and allows the heat-source-side refrigerant to flow only in a predetermined direction (i.e., a direction from the outdoor unit 1 toward the heat medium relay unit 3). The check valve 13b is provided in the first connection pipe 4a and makes the heat-source-side refrigerant discharged from the compressor 10 during the heating operation flow toward the heat medium relay unit 3. The check valve 13c is provided in the second connection pipe 4b and makes the heat-source-side refrigerant returning from the heat medium relay unit 3 during the heating operation flow toward the suction side of the compressor 10.

In the outdoor unit 1, the first connection pipe 4a connects the refrigerant pipe 4 between the first refrigerant flow switching device 11 and the check valve 13d to the refrigerant pipe 4 between the check valve 13a and the heat medium relay unit 3. In the outdoor unit 1, the second connection pipe 4b connects the refrigerant pipe 4 between the check valve 13d and the heat medium relay unit 3 to the refrigerant pipe 4 between the heat-source-side heat exchanger 12 and the check valve 13a. Although FIG. 2 shows the example in which the first connection pipe 4a, the second connection pipe 4b, the check valve 13a, the check valve 13b, the check valve 13c, and the check valve 13d are provided, the invention is not limited to this example, and these components do not necessarily need to be provided.

[Indoor Units 2]

Each of the indoor units 2 is equipped with a use-side heat exchanger 26. The use-side heat exchanger 26 is connected to a heat medium flow control device 25 and a second heat medium flow switching device 23 of the heat medium relay unit 3 by the pipes 5. The use-side heat exchanger 26 exchanges heat between air supplied from an air-sending device, such as a fan (not shown), and the first heat medium so as to generate heating air or cooling air to be supplied to the indoor space 7.

The example shown in FIG. 2 corresponds to a case where four indoor units 2 are connected to the heat medium relay unit 3 and include an indoor unit 2a, an indoor unit 2b, an indoor unit 2c, and an indoor unit 2d as viewed from the lower side of the drawing. In line with the indoor units 2a to 2d, the use-side heat exchangers 26 similarly include a use-side heat exchanger 26a, a use-side heat exchanger 26b, a use-side heat exchanger 26c, and a use-side heat exchanger 26d as viewed from the lower side of the drawing. Similar to FIG. 1, the number of connected indoor units 2 is not limited to four as shown in FIG. 2.

[Heat Medium Relay Unit 3]

The heat medium relay unit 3 is equipped with two heat exchangers 15 related to heat medium, three first expansion devices 16, a subcooling heat exchanger 50 for reducing the liquid temperature in a high pressure liquid pipe, a single on-off device 17, two second refrigerant flow switching devices 18, two pumps 21, four first heat medium flow switching devices 22, four second heat medium flow switching devices 23, and four heat medium flow control devices 25. Moreover, the heat medium relay unit 3 is provided with a connection port 51a and a connection port 51b for connecting to the water heating unit 300. In the heat pump device 100, the refrigerant pipes are connectable to each other via the connection ports (i.e., the connection port 51a and the connection port 51b) at the heat medium relay unit 3 side and connection ports (i.e., a connection port 305a and a connection port 305b) at the water heating unit 300 side, to be described later.

Furthermore, the heat medium relay unit 3 is provided with a bypass 55 that is parallel to the two heat exchangers 15 related to heat medium. The subcooling heat exchanger 50 is installed by utilizing this bypass 55. The bypass 55 branches off from the refrigerant pipe 4 connected to an inlet side of the heat medium relay unit 3 and connects to the refrigerant pipe 4 connected to an outlet side so as to be parallel to the two heat exchangers 15 related to heat medium. The subcooling heat exchanger 50 exchanges heat between the heat-source-side refrigerant flowing from the water heating unit 300 (which may include a refrigerant flowing into the heat medium relay unit 3 (see Embodiment 2)) and the heat-source-side refrigerant flowing through the bypass 55.

The two heat exchangers 15 related to heat medium (i.e., the heat exchanger 15a related to heat medium and the heat exchanger 15b related to heat medium) function as condensers (radiators) or evaporators and exchange heat between the heat-source-side refrigerant and the first heat medium so as to transfer the cooling energy or heating energy retained in the heat-source-side refrigerant generated in the outdoor unit 1 to the first heat medium. The heat exchanger 15a related to heat medium is provided between an expansion device 16a and a second refrigerant flow switching device 18a in the refrigerant circuit A, and is used for cooling the first heat medium during a cooling and heating mixed operation mode. The heat exchanger 15b related to heat medium is provided between an expansion device 16b and a second refrigerant flow switching device 18b in the refrigerant circuit A, and is used for heating the first heat medium during the cooling and heating mixed operation mode.

The three expansion devices 16 (i.e., the expansion device 16a, the expansion device 16b, and an expansion device 16c) function as pressure reducing valves and expansion valves and expand the heat-source-side refrigerant by reducing the pressure thereof. The expansion device 16a is provided at the upstream side of the heat exchanger 15a related to heat medium in the flowing direction of the heat-source-side refrigerant during the cooling operation. The expansion device 16b is provided at the upstream side of the heat exchanger 15b related to heat medium in the flowing direction of the heat-source-side refrigerant during the cooling operation. The expansion device 16c is provided for increasing the degree of subcooling of a high-pressure liquid refrigerant at the upstream side of the expansion device 16a and the expansion device 16b during the cooling operation so as to improve performance and make the operation stable. The expansion device 16c is provided in the bypass 55 that connects the high pressure liquid pipe and a low pressure gas pipe during a cooling only operation. The three expansion devices 16 may be constituted of, for example, electronic expansion valves whose opening degrees can be variably controlled. Alternatively, mechanical expansion valves may be used as the expansion devices 16.

The on-off device 17 is constituted of a two-way valve or the like, and opens and closes the refrigerant pipe 4. The on-off device 17 is provided in the refrigerant pipe 4 at the inlet side for the heat-source-side refrigerant, specifically, in a pipe that connects the two refrigerant pipes 311.

The two second refrigerant flow switching devices 18 (i.e., the second refrigerant flow switching device 18a and the second refrigerant flow switching device 18b) are constituted of, for example, four-way valves, and switch the flow of the heat-source-side refrigerant in accordance with the operation modes. The second refrigerant flow switching device 18a is provided at the downstream side of the heat exchanger 15a related to heat medium in the flowing direction of the heat-source-side refrigerant during the cooling operation. The second refrigerant flow switching device 18b is provided at the downstream side of the heat exchanger 15b related to heat medium in the flowing direction of the heat-source-side refrigerant during the cooling only operation mode.

The two pumps 21 (i.e., a pump 21a and a pump 21b) are provided for circulating the first heat medium via the pipes 5. The pump 21a is provided in the pipe 5 between the heat exchanger 15a related to heat medium and the second heat medium flow switching devices 23. The pump 21b is provided in the pipe 5 between the heat exchanger 15b related to heat medium and the second heat medium flow switching devices 23. The two pumps 21 may be constituted of, for example, variably controllable pumps such that the flow rate therein can be controlled in accordance with the magnitude of load in the indoor units 2.

Each of the four first heat medium flow switching devices 22 (i.e., first heat medium flow switching devices 22a to 22d) is constituted of a three-way valve or the like, and switches the passage of the first heat medium. The number of first heat medium flow switching devices 22 provided (four, in this case) corresponds to the number of indoor units 2 installed. With regard to each of the first heat medium flow switching devices 22, one side of the three-way valve is connected to the heat exchanger 15a related to heat medium, another side of the three-way valve is connected to the heat exchanger 15b related to heat medium, and the remaining side of the three-way valve is connected to the corresponding heat medium flow control device 25. The first heat medium flow switching devices 22 are provided at the outlet side of the heat medium passages of the use-side heat exchangers 26. In line with the indoor units 2, a first heat medium flow switching device 22a, a first heat medium flow switching device 22b, a first heat medium flow switching device 22c, and a first heat medium flow switching device 22d are shown from the lower side of the drawing. The switching of each heat medium passage includes partial switching from one side to another side in addition to complete switching from one side to another side.

Each of the four second heat medium flow switching devices 23 (i.e., second heat medium flow switching devices 23a to 23d) is constituted of a three-way valve or the like, and switches the passage of the first heat medium. The number of second heat medium flow switching devices 23 provided (four, in this case) corresponds to the number of indoor units 2 installed. With regard to each of the second heat medium flow switching devices 23, one side of the three-way valve is connected to the heat exchanger 15a related to heat medium, another side of the three-way valve is connected to the heat exchanger 15b related to heat medium, and the remaining side of the three-way valve is connected to the corresponding use-side heat exchanger 26. The second heat medium flow switching devices 23 are provided at the inlet side of the heat medium passages of the use-side heat exchangers 26. In line with the indoor units 2, a second heat medium flow switching device 23a, a second heat medium flow switching device 23b, a second heat medium flow switching device 23c, and a second heat medium flow switching device 23d are shown from the lower side of the drawing. The switching of each heat medium passage includes partial switching from one side to another side in addition to complete switching from one side to another side.

Each of the four heat medium flow control devices 25 (i.e., heat medium flow control devices 25a to 25d) is constituted of a two-way valve or the like that can control the opening area, and controls the flow rate of the first heat medium flowing into the corresponding use-side heat exchanger 26 (i.e., the corresponding pipe 5). The number of heat medium flow control devices 25 provided (four, in this case) corresponds to the number of indoor units 2 installed. With regard to each of the heat medium flow control devices 25, one side of the two-way valve is connected to the corresponding use-side heat exchanger 26, and the other side is connected to the corresponding first heat medium flow switching device 22. The heat medium flow control devices 25 are provided at the outlet side of the heat medium passages of the use-side heat exchangers 26. Specifically, the heat medium flow control devices 25 control the amount of first heat medium flowing into the indoor units 2 in accordance with the temperature of the first heat medium flowing into the indoor units 2 and the temperature of the first heat medium flowing out therefrom so as to provide an optimal amount of first heat medium to the indoor units 2 in accordance with the load.

In line with the indoor units 2, a heat medium flow control device 25*a*, a heat medium flow control device 25*b*, a heat medium flow control device 25*c*, and a heat medium flow control device 25*d* are shown from the lower side of the drawing. Alternatively, the heat medium flow control devices 25 may be provided at the inlet side of the heat medium passages of the use-side heat exchangers 26. As another alternative, the heat medium flow control devices 25 may be provided at the inlet side of the heat medium passages of the use-side heat exchangers 26 and between the second heat medium flow switching devices 23 and the use-side heat exchangers 26. Furthermore, the heat medium flow control devices 25 may be completely closed when the indoor units 2 do not need load, such as when they are stopped or are in a thermostat-off state, thereby stopping the supply of heat medium to the indoor units 2.

The heat medium relay unit 3 is provided with two connection ports (i.e., the connection port 51*a* and the connection port 51*b*) for connecting to the water heating unit 300. The connection port 51*a* is provided upstream of the on-off device 17. The connection port 51*b* is provided between the on-off device 17 and a high-pressure-side inlet of the subcooling heat exchanger 50. Specifically, the connection port 51*a* and the connection port 51*b* are provided for connecting the refrigerant pipes 311 branching off from the refrigerant pipes 4 within the heat medium relay unit 3 to the water heating unit 300.

The heat medium relay unit 3 is provided with various kinds of detecting means (i.e., two first temperature sensors 31, four second temperature sensors 34, four third temperature sensors 35, a first pressure sensor 36, a fourth temperature sensor 52, and a fifth temperature sensor 53). Information (temperature information and pressure information) detected by these detecting means is transmitted to a controller (not shown) that controls the overall operation of the heat pump device 100 and is used for controlling, for example, the driving frequency of the compressor 10, the rotation speed of the air-sending device (not shown), the switching of the first refrigerant flow switching device 11, the driving frequencies of the pumps 21, the switching of the second refrigerant flow switching devices 18, the switching of the passages for the first heat medium, and the adjustment of the heat-medium flow rate for the indoor units 2.

The two first temperature sensors 31 (i.e., a first temperature sensor 31*a* and a first temperature sensor 31*b*) detect the temperature of the first heat medium flowing out from the heat exchangers 15 related to heat medium, that is, the first heat medium at the outlets of the heat exchangers 15 related to heat medium, and may be constituted of, for example, thermistors. The first temperature sensor 31*a* is provided in the pipe 5 at the inlet side of the pump 21*a*. The first temperature sensor 31*b* is provided in the pipe 5 at the inlet side of the pump 21*b*.

The four second temperature sensors 34 (i.e., second temperature sensors 34*a* to 34*d*) are provided between the first heat medium flow switching devices 22 and the heat medium flow control devices 25 and detect the temperature of the first heat medium flowing out from the use-side heat exchangers 26, and may be constituted of, for example, thermistors. The number of second temperature sensors 34 provided (four, in this case) corresponds to the number of indoor units 2 installed. In line with the indoor units 2, a second temperature sensor 34*a*, a second temperature sensor 34*b*, a second temperature sensor 34*c*, and a second temperature sensor 34*d* are shown from the lower side of the drawing. Alternatively, the second temperature sensors 34 may be provided in the passages between the heat medium flow control devices 25 and the use-side heat exchangers 26.

The four third temperature sensors 35 (i.e., third temperature sensors 35*a* to 35*d*) are provided at the heat-source-side-refrigerant inlet side or outlet side of the heat exchangers 15 related to heat medium and detect the temperature of the heat-source-side refrigerant flowing into the heat exchangers 15 related to heat medium or the temperature of the heat-source-side refrigerant flowing out from the heat exchangers 15 related to heat medium, and may be constituted of, for example, thermistors. The third temperature sensor 35*a* is provided between the heat exchanger 15*a* related to heat medium and the second refrigerant flow switching device 18*a*. The third temperature sensor 35*b* is provided between the heat exchanger 15*a* related to heat medium and the expansion device 16*a*. The third temperature sensor 35*c* is provided between the heat exchanger 15*b* related to heat medium and the second refrigerant flow switching device 18*b*. The third temperature sensor 35*d* is provided between the heat exchanger 15*b* related to heat medium and the expansion device 16*b*.

Similar to the installation position of the third temperature sensor 35*d*, the first pressure sensor 36 is provided between the heat exchanger 15*b* related to heat medium and the expansion device 16*b*, and detects the pressure of the heat-source-side refrigerant flowing between the heat exchanger 15*b* related to heat medium and the expansion device 16*b*.

The fourth temperature sensor 52 is provided in the bypass 55 at the outlet side of the subcooling heat exchanger 50 and detects the temperature of the heat-source-side refrigerant flowing out from the subcooling heat exchanger 50, and may be constituted of, for example, a thermistor. The fifth temperature sensor 53 is provided in the bypass 55 at the inlet side of the subcooling heat exchanger 50 and detects the temperature of the heat-source-side refrigerant flowing into the subcooling heat exchanger 50, and may be constituted of, for example, a thermistor. Based on a temperature difference between the temperature detected by the fifth temperature sensor 53 and the temperature detected by the fourth temperature sensor 52, the opening degree of the expansion device 16*c* is adjusted.

The controller (not shown) is constituted of a microcomputer or the like and controls the driving frequency of the compressor 10, the rotation speed (including on/off operation) of the air-sending device, the switching of the first refrigerant flow switching device 11, the driving of the pumps 21, the opening degrees of the first expansion devices 16, the opening and closing of the on-off device 17, the switching of the second refrigerant flow switching devices 18, the switching of the first heat medium flow switching devices 22, the switching of the second heat medium flow switching devices 23, and the opening degrees of the heat medium flow control devices 25 on the basis of the detection information from the various kinds of detecting means and a command from a remote controller so as to execute each operation mode, to be described later. The controller may be provided for each unit, or may be provided in the outdoor unit 1 or the heat medium relay unit 3. If the controllers are provided in the individual units, the controllers are wired or wirelessly connected to each other in a communicable manner so as to perform cooperative control.

The pipes 5 through which the first heat medium flows include a pipe connected to the heat exchanger 15*a* related to heat medium and a pipe connected to the heat exchanger 15*b* related to heat medium. The pipes 5 each branch off (into four branches, in this case) in accordance with the number of indoor units 2 connected to the heat medium relay unit 3. The pipes 5 are connected by the first heat medium flow switching devices 22 and the second heat medium flow switching devices 23. By controlling the first heat medium flow switching devices 22 and the second heat medium flow switching devices 23, the first heat medium from the heat exchanger 15a related to heat medium can be made to flow into the use-side heat exchangers 26, or the first heat medium from the heat exchanger 15b related to heat medium can be made to flow into the use-side heat exchangers 26. Specifically, by controlling the first heat medium flow switching devices 22 and the second heat medium flow switching devices 23, the inflow passages and the outflow passages of the use-side heat exchangers 26 can be selectively connected to the heat exchanger 15a related to heat medium and the heat exchanger 15b related to heat medium.

[Water Heating Unit]

The water heating unit 300 is equipped with a compressor (i.e., a second compressor) 301, two heat exchangers (i.e., a heat exchanger 304 and a heat exchanger 302), and two expansion devices (i.e., an expansion device 303 and an expansion device (i.e., a third expansion device) 312). Furthermore, a connection port 305a and a connection port 305b for connecting to the heat medium relay unit 3 are also provided. The refrigerant pipes 311, which branch off from sections of the refrigerant pipes 4, are installed in the connection port 305a and the connection port 305b. The compressor 301, the heat exchanger (i.e., a first heat exchanger) 302, the expansion device (i.e., a second expansion device) 303, and the heat exchanger (i.e., a second heat exchanger) 304 are connected with refrigerant pipes 315 through which the water-heating-unit-side refrigerant flows, thereby forming the refrigerant circuit C.

The compressor 301 suctions the water-heating-unit-side refrigerant and compresses the water-heating-unit-side refrigerant into a high-temperature high-pressure state, and may be constituted of, for example, a capacity-controllable inverter compressor. The compressor 301 functions as a second compressor that makes the water-heating-unit-side refrigerant circulate through the refrigerant circuit C. The rotation speed (i.e., the driving frequency) of the compressor 301 is controlled on the basis of a command from control means (not shown).

The heat exchanger 302 functions as a condenser and exchanges heat between the water-heating-unit-side refrigerant circulating through the refrigerant circuit C and the second heat medium circulating through the pipes 402 so as to heat the second heat medium. The heat exchanger 304 functions as an evaporator and exchanges heat between the water-heating-unit-side refrigerant circulating through the refrigerant circuit C and the heat-source-side refrigerant circulating through the refrigerant circuit A so as to cool the heat-source-side refrigerant. Specifically, the water heating unit 300 is connected to the heat medium relay unit 3 via the heat exchanger 304 and is connected to the hot-water storage tank 400 via the heat exchanger 302. The heat exchanger 302 and the heat exchanger 304 are not particularly limited in type, and may be, for example, plate fin tube heat exchangers or double-pipe heat exchangers.

The expansion device 303 functions as a pressure reducing valve or an expansion valve and reduces the pressure of the water-heating-unit-side refrigerant in a high-pressure state. The expansion device 303 is provided between the heat exchanger 302 and the heat exchanger 304. The expansion device 312 functions as a pressure reducing valve or an expansion valve and reduces the pressure of the heat-source-side refrigerant in a high-pressure state. The expansion device 312 is provided between the heat exchanger 304 and the subcooling heat exchanger 50 in the refrigerant circuit A. The expansion device 303 and the expansion device 312 may be constituted of, for example, electronic expansion valves whose opening degrees can be variably controlled. Alternatively, mechanical expansion valves may be used as the expansion device 303 and the expansion device 312.

The water heating unit 300 is provided with various kinds of detecting means (i.e., a sixth temperature sensor 306, a seventh temperature sensor 307, an eighth temperature sensor 308, a second pressure sensor 309, and a third pressure sensor 310). Information (temperature information) detected by these detecting means is transmitted to the controller (not shown) that controls the overall operation of the heat pump device 100 and is used for controlling the driving frequency of the compressor 301 and the opening degrees of the expansion device 303 and the expansion device 312, in addition to, for example, the driving frequency of the compressor 10, the rotation speed of the air-sending device (not shown), the switching of the first refrigerant flow switching device 11, the driving frequencies of the pumps 21, the switching of the second refrigerant flow switching devices 18, the switching of the passages for the first heat medium, and the adjustment of the heat-medium flow rate for the indoor units 2.

The sixth temperature sensor 306 is provided at the second-heat-medium outlet side of the heat exchanger 302 and detects the temperature of the second heat medium flowing out from the heat exchanger 302, that is, the second heat medium having exchanged heat at the heat exchanger 302, and may be constituted of, for example, a thermistor. The seventh temperature sensor 307 is provided at the second-heat-medium inlet side of the heat exchanger 302 and detects the temperature of the second heat medium flowing into the heat exchanger 302, that is, the second heat medium returning from the hot-water storage tank 400, and may be constituted of, for example, a thermistor. The eighth temperature sensor 308 is provided at the water-heating-unit-side-refrigerant outlet side of the heat exchanger 304 and detects the temperature of the water-heating-unit-side refrigerant flowing out from the heat exchanger 304, that is, the water-heating-unit-side refrigerant having exchanged heat at the heat exchanger 304, and may be constituted of, for example, a thermistor.

The second pressure sensor 309 is provided between the heat exchanger 304 and the compressor 301 in the refrigerant circuit C and detects the pressure of the water-heating-unit-side refrigerant at the outlet side of the heat exchanger 304, that is, the water-heating-unit-side refrigerant to be suctioned into the compressor 301. The third pressure sensor 310 is provided between the compressor 301 and the heat exchanger 302 in the refrigerant circuit C and detects the pressure of the water-heating-unit-side refrigerant at the inlet side of the heat exchanger 302, that is, the water-heating-unit-side refrigerant discharged from the compressor 301.

The heat exchanger 302 is connected to the pipes 402, and the second heat medium circulates through the water transport unit 401, the hot-water storage tank 400, and the heat exchanger 302 in that order. The water transport unit 401 circulates the second heat medium via the pipes 402. The water transport unit 401 is provided in the pipe 402 between the heat exchanger 302 and the hot-water storage tank 400. The water transport unit 401 may be constituted of, for example, a capacity-controllable pump. The hot-water storage tank 400 stores the second heat medium increased in temperature by the heat exchanger 302. The heat exchanger 302 is as described above.

In the heat pump device 100, the compressor 10, the first refrigerant flow switching device 11, the heat-source-side heat exchanger 12, the on-off device 17, the second refrigerant flow switching devices 18, the refrigerant passages in the heat exchangers 15 related to heat medium, the first expansion devices 16, and the accumulator 19 are connected by the refrigerant pipes 4, thereby constituting the refrigerant circuit A. The heat medium passages in the heat exchangers 15 related to heat medium, the pumps 21, the first heat medium flow switching devices 22, the heat medium flow control devices 25, the use-side heat exchangers 26, and the second heat medium flow switching devices 23 are connected with the pipes 5, thereby constituting the heat medium circuit B. Specifically, the plurality of use-side heat exchangers 26 are connected in parallel to each of the heat exchangers 15 related to heat medium, thereby turning the heat medium circuit B into a multi-system.

Furthermore, the compressor 301, the water-heating-unit-side refrigerant passage in the heat exchanger 302, the expansion device 303, and the water-heating-unit-side refrigerant passage in the heat exchanger 304 are connected by the refrigerant pipes 315, thereby constituting the refrigerant circuit C. The hot-water storage tank 400, the second-heat-medium passage in the heat exchanger 302, and the water transport unit 401 are connected with the pipes 402, thereby constituting a hot-water storage circuit D (i.e., a second heat medium circuit). Specifically, the water heating unit 300 receives heat via the heat exchanger 304 and heats the second heat medium via the heat exchanger 302.

Accordingly, in the heat pump device 100, the outdoor unit 1 and the heat medium relay unit 3 are connected to each other via the heat exchanger 15a related to heat medium and the heat exchanger 15b related to heat medium provided in the heat medium relay unit 3, and the heat medium relay unit 3 and the indoor units 2 are also connected to each other via the heat exchanger 15a related to heat medium and the heat exchanger 15b related to heat medium. Specifically, in the heat pump device 100, the heat-source-side refrigerant circulating through the refrigerant circuit A and the first heat medium circulating through the heat medium circuit B exchange heat at the heat exchanger 15a related to heat medium and the heat exchanger 15b related to heat medium.

Furthermore, in the heat pump device 100, the outdoor unit 1 and the water heating unit 300 are connected to each other via the heat exchanger 304 provided in the water heating unit 300. Specifically, in the heat pump device 100, the heat-source-side refrigerant circulating through the refrigerant circuit A and the water-heating-unit-side refrigerant circulating through the refrigerant circuit C exchange heat at the heat exchanger 304. Furthermore, in the heat pump device 100, the water heating unit 300 and the hot-water storage tank 400 are connected to each other via the heat exchanger 302 provided in the water heating unit 300. Specifically, in the heat pump device 100, the water-heating-unit-side refrigerant circulating through the refrigerant circuit C and the second heat medium circulating through the hot-water storage circuit D exchange heat at the heat exchanger 302.

[Operation Modes]

The operation modes executed by the heat pump device 100 will now be described. Based on commands from the indoor units 2 and the water heating unit 300, the heat pump device 100 can perform a cooling operation or a heating operation in each indoor unit 2 and an operation for heating the second heat medium in the water heating unit 300. Specifically, the heat pump device 100 can perform the same operation in all of the indoor units 2 or perform different operations in the indoor units 2. Moreover, the heat pump device 100 can perform a hot-water supply operation via the water heating unit 300.

The operation modes executable by the heat pump device 100 include a cooling only operation mode in which all of the driven indoor units 2 perform the cooling operation (including two patterns, that is, a pattern in which the water heating unit 300 is in operation and a pattern in which the water heating unit 300 is stopped), a heating only operation mode in which all of the driven indoor units 2 perform the heating operation, a cooling main operation mode in which the cooling load is greater than the heating load in a cooling and heating mixed operation mode, and a heating main operation mode in which the heating load is greater than the cooling load in the cooling and heating mixed operation mode. Each of the operation modes will be described below together with the flow of the heat-source-side refrigerant, the first heat medium, the water-heating-unit-side refrigerant, and the second heat medium.

[Cooling Only Operation Mode 1 (Pattern in which Water Heating Unit 300 is Stopped)]

Figure 3:
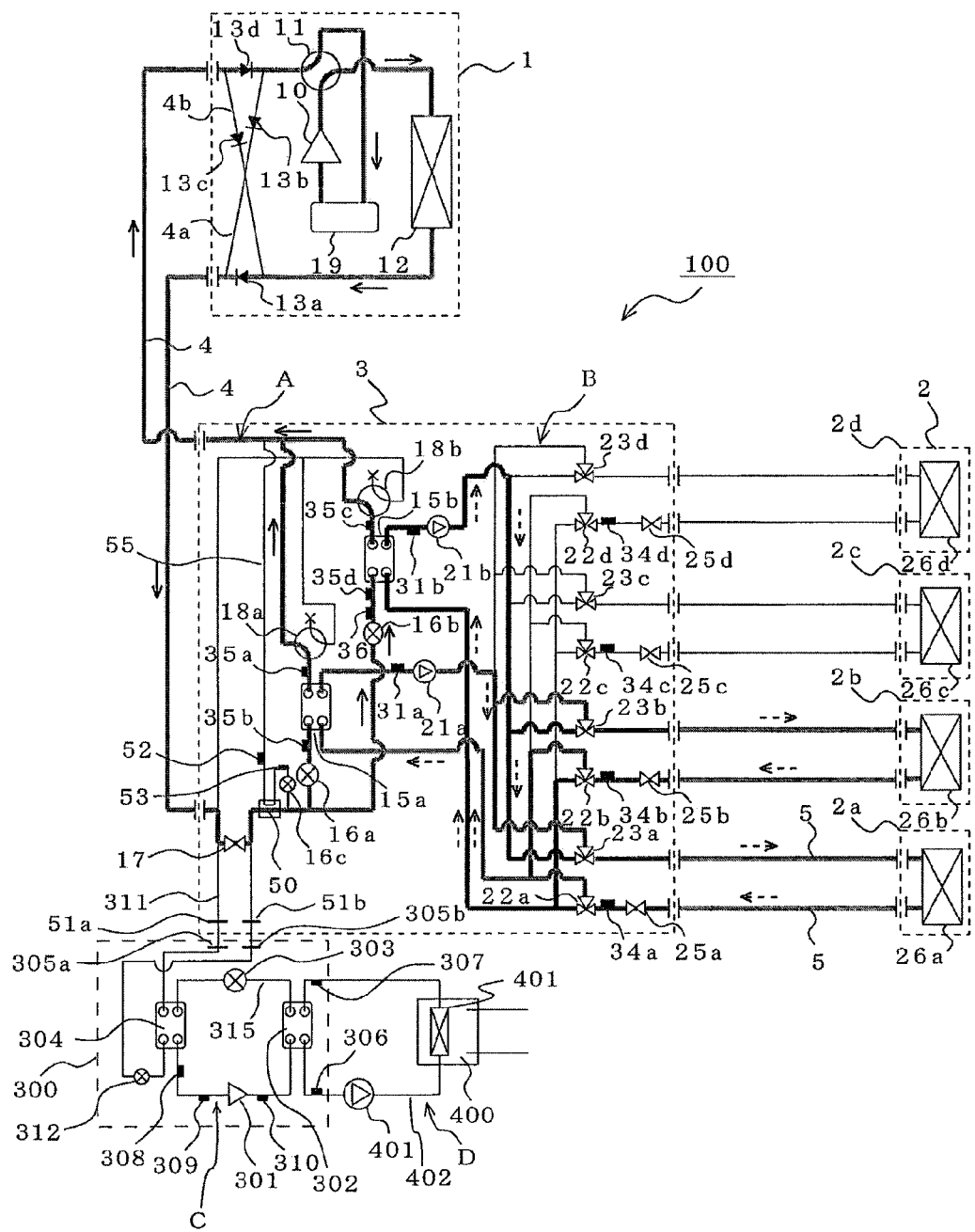
FIG. 3 is a refrigerant circuit diagram illustrating the flow of refrigerants during a cooling only operation mode 1 in the heat pump device according to Embodiment 1 of the present invention.

FIG. 3 is a refrigerant circuit diagram illustrating the flow of the refrigerants during a cooling only operation mode 1 in the heat pump device 100. The cooling only operation mode 1 in FIG. 3 is directed to an example where cooling load is generated only in the use-side heat exchanger 26a and the use-side heat exchanger 26b. In the cooling only operation mode 1, all of the indoor units 2 perform the cooling operation, and the water heating unit 300 is stopped. In FIG. 3, pipes denoted by thick lines are pipes through which the heat-source-side refrigerant and the first heat medium flow. Furthermore, in FIG. 3, the flowing direction of the heat-source-side refrigerant is denoted by solid arrows, whereas the flowing direction of the first heat medium is denoted by dashed arrows.

In the cooling only operation mode 1 shown in FIG. 3, in the outdoor unit 1, the first refrigerant flow switching device 11 is switched so as to cause the heat-source-side refrigerant discharged from the compressor 10 to flow into the heat-source-side heat exchanger 12. In the heat medium relay unit 3, the pump 21a and the pump 21b are driven, the heat medium flow control device 25a and the heat medium flow control device 25b are opened, the heat medium flow control device 25c and the heat medium flow control device 25d are completely closed, and the first heat medium is made to circulate between each of the heat exchangers 15a and 15b related to heat medium and the use-side heat exchangers 26a and 26b. In the water heating unit 300, the compressor 301 is stopped, and the expansion device 312 is completely closed.

First, the flow of the heat-source-side refrigerant in the refrigerant circuit A will be described.

A low-temperature low-pressure refrigerant is compressed by the compressor 10 so that a high-temperature high-pressure gas refrigerant is discharged therefrom. The high-temperature high-pressure gas refrigerant discharged from the compressor 10 flows into the heat-source-side heat exchanger 12 via the first refrigerant flow switching device 11. Then, the high-temperature high-pressure gas refrigerant condenses and liquefies at the heat-source-side heat exchanger 12 while transferring heat to outdoor air, thereby becoming a high-pressure liquid refrigerant. The high-pressure liquid refrigerant flowing out from the heat-source-side heat exchanger 12 travels through the check valve 13a so as to flow out from the outdoor unit 1, and then travels through the refrigerant pipe 4 so as to flow into the heat medium relay unit 3. The high-pressure liquid refrigerant flowing into the heat medium relay unit 3 does not flow toward the water heating unit 300 since the expansion device 312 is completely closed, but travels through the on-off device 17 and is distributed to the expansion device 16a and the expansion device 16b where the high-pressure liquid refrigerant is expanded to become a low-temperature low-pressure two-phase refrigerant.

This two-phase refrigerant flows into the heat exchanger 15a related to heat medium and the heat exchanger 15b related to heat medium functioning as evaporators and receives heat from the first heat medium circulating through the heat medium circuit B so as to become a low-temperature low-pressure gas refrigerant while cooling the first heat medium. The gas refrigerant flowing out from the heat exchanger 15a related to heat medium and the heat exchanger 15b related to heat medium flows out from the heat medium relay unit 3 via the second refrigerant flow switching device 18a and the second refrigerant flow switching device 18b and then travels through the refrigerant pipe 4 so as to flow back into the outdoor unit 1. The refrigerant flowing into the outdoor unit 1 travels through the check valve 13d and is suctioned into the compressor 10 again via the first refrigerant flow switching device 11 and the accumulator 19.

In this case, the opening degree of the expansion device 16a is controlled such that the degree of superheat obtained as a difference between the temperature detected by the third temperature sensor 35a and the temperature detected by the third temperature sensor 35b is made constant. Similarly, the opening degree of the expansion device 16b is controlled such that the degree of superheat obtained as a difference between the temperature detected by the third temperature sensor 35c and the temperature detected by the third temperature sensor 35d is made constant. The on-off device 17 is in an open state.

Next, the flow of the first heat medium in the heat medium circuit B will be described.

In the cooling only operation mode 1, the cooling energy of the heat-source-side refrigerant is transferred to the first heat medium at both the heat exchanger 15a related to heat medium and the heat exchanger 15b related to heat medium, and the cooled first heat medium is made to flow through the pipes 5 by the pump 21a and the pump 21b. The first heat medium pressurized in and flowing out from the pump 21a and the pump 21b flows into the use-side heat exchanger 26a and the use-side heat exchanger 26b via the second heat medium flow switching device 23a and the second heat medium flow switching device 23b. Then, the first heat medium receives heat from indoor air at the use-side heat exchanger 26a and the use-side heat exchanger 26b, thereby cooling the indoor space 7.

Subsequently, the first heat medium flows out from the use-side heat exchanger 26a and the use-side heat exchanger 26b and then flows into the heat medium flow control device 25a and the heat medium flow control device 25b. In this case, with the functions of the heat medium flow control device 25a and the heat medium flow control device 25b, the amount of first heat medium flowing into the use-side heat exchanger 26a and the use-side heat exchanger 26b is controlled to be an amount that is sufficient to cover the air-conditioning load required in the indoor space. The first heat medium flowing out from the heat medium flow control device 25a and the heat medium flow control device 25b travels through the first heat medium flow switching device 22a and the first heat medium flow switching device 22b so as to flow into the heat exchanger 15a related to heat medium and the heat exchanger 15b related to heat medium, and is suctioned into the pump 21a and the pump 21b again.

In the pipes 5 for the use-side heat exchangers 26, the first heat medium flows in the direction from the second heat medium flow switching devices 23 toward the first heat medium flow switching devices 22 via the heat medium flow control devices 25. The air-conditioning load required in the indoor space 7 can be covered by performing control such that a difference between the temperature detected by the first temperature sensor 31a or the temperature detected by the first temperature sensor 31b and the temperature detected by each of the second temperature sensors 34 is maintained as a target value. The outlet temperature of the heat exchangers 15 related to heat medium may be the temperature of the first temperature sensor 31a or the first temperature sensor 31b or may be an average temperature of these sensors. In this case, the first heat medium flow switching devices 22 and the second heat medium flow switching devices 23 are controlled to intermediate opening degrees so that passages extending to both the heat exchanger 15a related to heat medium and the heat exchanger 15b related to heat medium are ensured.

In case of executing the cooling only operation mode 1, since it is not necessary to make the first heat medium flow to use-side heat exchangers 26 with no air-conditioning load (including those in a thermostat-off state), the passages therefor are closed by the corresponding heat medium flow control devices 25, thereby preventing the first heat medium from flowing toward the use-side heat exchangers 26. In FIG. 3, since there is air-conditioning load in the use-side heat exchanger 26a and the use-side heat exchanger 26b, the first heat medium is made to flow into these heat exchangers. In contrast, since there is no air-conditioning load in the use-side heat exchanger 26c and the use-side heat exchanger 26d, the corresponding heat medium flow control device 25c and the corresponding heat medium flow control device 25d are completely closed. If air-conditioning load is generated from the use-side heat exchanger 26c or the use-side heat exchanger 26d, the heat medium flow control device 25c or the heat medium flow control device 25d may be opened so as to circulate the first heat medium.

[Cooling Only Operation Mode 2 (Pattern in which Water Heating Unit 300 is Driven)]

Figure 4:
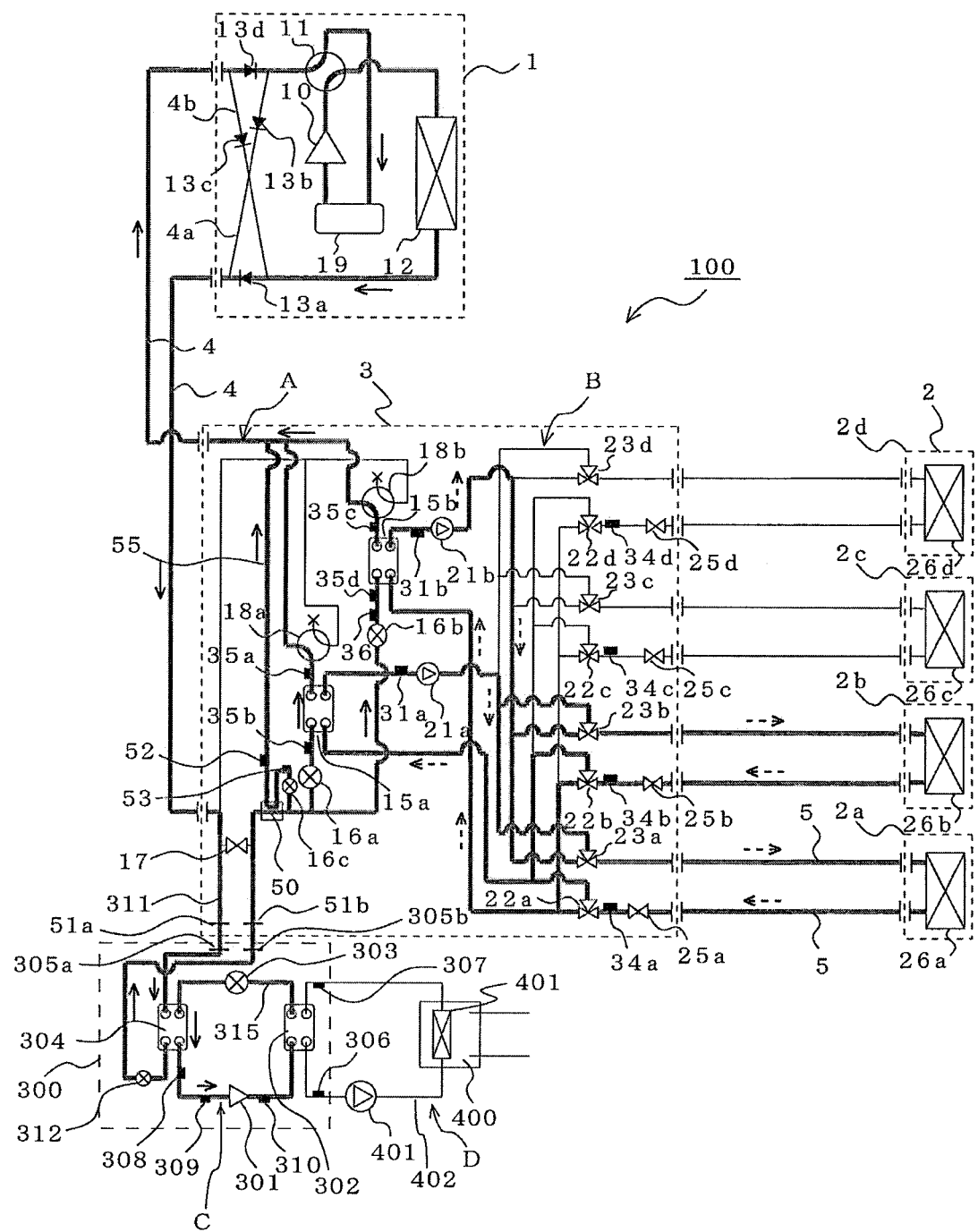
FIG. 4 is a refrigerant circuit diagram illustrating the flow of the refrigerants during a cooling only operation mode 2 in the heat pump device according to Embodiment 1 of the present invention.

FIG. 4 is a refrigerant circuit diagram illustrating the flow of the refrigerants during a cooling only operation mode 2 in the heat pump device 100. The cooling only operation mode 2 in FIG. 4 is directed to an example where cooling load is generated only in the use-side heat exchanger 26a and the use-side heat exchanger 26b, and the water heating unit 300 is in operation. In the cooling only operation mode 2, all of the indoor units 2 perform the cooling operation, and the water heating unit 300 is in operation. In FIG. 4, pipes denoted by thick lines are pipes through which the refrigerants (i.e., the heat-source-side refrigerant and the water-heating-unit-side refrigerant) and the first heat medium flow. Furthermore, in FIG. 4, the flowing direction of the heat-source-side refrigerant and the water-heating-unit-side refrigerant is denoted by solid arrows, whereas the flowing direction of the first heat medium is denoted by dashed arrows.

In the cooling only operation mode 2 shown in FIG. 4, in the outdoor unit 1, the first refrigerant flow switching device 11 is switched so as to cause the heat-source-side refrigerant discharged from the compressor 10 to flow into the heat-source-side heat exchanger 12. In the heat medium relay unit 3, the pump 21a and the pump 21b are driven, the heat medium flow control device 25a and the heat medium flow control device 25b are opened, the heat medium flow control device 25c and the heat medium flow control device 25d are completely closed, and the first heat medium is made to circulate between each of the heat exchangers 15a and 15b related to heat medium and the use-side heat exchangers 26a and 26b. The control mode of the outdoor unit 1 is the same as that in the cooling main operation mode. Furthermore, in the water heating unit 300, the compressor 301 is driven so that the water-heating-unit-side refrigerant is made to circulate through the refrigerant circuit C, and the expansion device 312 is set in an open state.

First, the flow of the heat-source-side refrigerant in the refrigerant circuit A will be described.

A low-temperature low-pressure refrigerant is compressed by the compressor 10 so that a high-temperature high-pressure gas refrigerant is discharged therefrom. The high-temperature high-pressure gas refrigerant discharged from the compressor 10 flows into the heat-source-side heat exchanger 12 via the first refrigerant flow switching device 11. Then, the high-temperature high-pressure gas refrigerant condenses and liquefies at the heat-source-side heat exchanger 12 while transferring heat to outdoor air, thereby becoming a high-pressure two-phase gas-liquid refrigerant. The high-pressure two-phase refrigerant flowing out from the heat-source-side heat exchanger 12 travels through the check valve 13*a* so as to flow out from the outdoor unit 1, and then travels through the refrigerant pipe 4 so as to flow into the heat medium relay unit 3 and the water heating unit 300. The high-pressure two-phase refrigerant flowing into the water heating unit 300 flows into the heat-source-side refrigerant passage in the heat exchanger 304. The high-pressure two-phase refrigerant is condensed by exchanging heat with the water-heating-unit-side refrigerant, and is subsequently expanded by the expansion device 312.

After flowing out from the water heating unit 300, the heat-source-side refrigerant flows into the subcooling heat exchanger 50. The heat-source-side refrigerant flowing into the subcooling heat exchanger 50 exchanges heat with the heat-source-side refrigerant flowing through the bypass 55, thereby becoming a high-pressure liquid refrigerant. A portion of this high-pressure liquid refrigerant flows into the bypass 55, while a remaining portion thereof flows into the expansion device 16*a* and the expansion device 16*b*. The high-pressure liquid refrigerant flowing into the bypass 55 is expanded by the expansion device 16*c* so as to become a low-pressure two-phase refrigerant, which then flows toward the bypass 55 side of the subcooling heat exchanger 50. The low-pressure two-phase refrigerant flowing into the bypass 55 side of the subcooling heat exchanger 50 exchanges heat with the high-pressure refrigerant so as to become a low gas refrigerant, which then flows into the low-pressure pipe. The high-pressure liquid refrigerant flowing into the expansion device 16*a* and the expansion device 16*b* is expanded by the expansion device 16*a* and the expansion device 16*b*, thereby becoming a low-temperature low-pressure two-phase refrigerant.

The low-temperature low-pressure two-phase refrigerant flows into the heat exchanger 15*a* related to heat medium and the heat exchanger 15*b* related to heat medium functioning as evaporators and receives heat from the first heat medium circulating through the heat medium circuit B so as to become a low-temperature low-pressure gas refrigerant while cooling the first heat medium. The gas refrigerant flowing out from the heat exchanger 15*a* related to heat medium and the heat exchanger 15*b* related to heat medium travels through the second refrigerant flow switching device 18*a* and the second refrigerant flow switching device 18*b* and subsequently merges with the low-pressure gas refrigerant flowing from the bypass 55. The merged refrigerant flows out from the heat medium relay unit 3 and travels through the refrigerant pipe 4 so as to flow back into the outdoor unit 1. The refrigerant flowing into the outdoor unit 1 travels through the check valve 13*d* and is suctioned into the compressor 10 again via the first refrigerant flow switching device 11 and the accumulator 19.

In this case, the opening degree of the expansion device 16*a* is controlled such that the degree of superheat obtained as a difference between the temperature detected by the third temperature sensor 35*a* and the temperature detected by the third temperature sensor 35*b* is made constant. Similarly, the opening degree of the expansion device 16*b* is controlled such that the degree of superheat obtained as a difference between the temperature detected by the third temperature sensor 35*c* and the temperature detected by the third temperature sensor 35*d* is made constant. The opening degree of the expansion device 16*c* is controlled such that the degree of superheat obtained as a difference between the temperature detected by the fourth temperature sensor 52 and the temperature detected by the fifth temperature sensor 53 is made constant. The expansion device 16*c* is set in an open state, and the on-off device 17 is set in a closed state.

Next, the flow of the water-heating-unit-side refrigerant in the refrigerant circuit C will be described.

The water-heating-unit-side refrigerant compressed by the compressor 301 becomes a high-temperature high-pressure gas refrigerant, which then flows into the water-heating-unit-side refrigerant passage in the heat exchanger 302. In the heat exchanger 302, the water-heating-unit-side refrigerant exchanges heat with the second heat medium (e.g., hot water) returning from the hot-water storage tank 400 so that the second heat medium is heated to a high temperature and the water-heating-unit-side refrigerant is decreased in temperature (by enthalpy), and then flows out from the heat exchanger 302.

The water-heating-unit-side refrigerant flowing out from the heat exchanger 302 is decompressed by the expansion device 303 so as to become a low-pressure two-phase refrigerant, which then flows into the water-heating-unit-side refrigerant passage in the heat exchanger 304. The water-heating-unit-side refrigerant flowing into the heat exchanger 304 exchanges heat with the heat-source-side refrigerant flowing from the heat medium relay unit 3 via the connection port 51*a* and the connection port 305*a*. Then, the heat-source-side refrigerant condenses into a liquid state, whereas the water-heating-unit-side refrigerant evaporates into a gaseous state. The heat-source-side refrigerant condensed into the liquid state is decompressed by the expansion device 312 and is transported to the heat medium relay unit 3 via the connection port 305*b* and the connection port 51*b*. The water-heating-unit-side refrigerant in the gaseous state is suctioned into the compressor 301 again. The reason that the refrigerant circuit C can supply high-temperature water will be described later in a description of the heating only operation mode.

A description of the flow of the first heat medium in the heat medium circuit B will be omitted here since it is the same as that in the cooling only operation mode 1 shown in FIG. 4.

[Heating Only Operation Mode]

Figure 5:
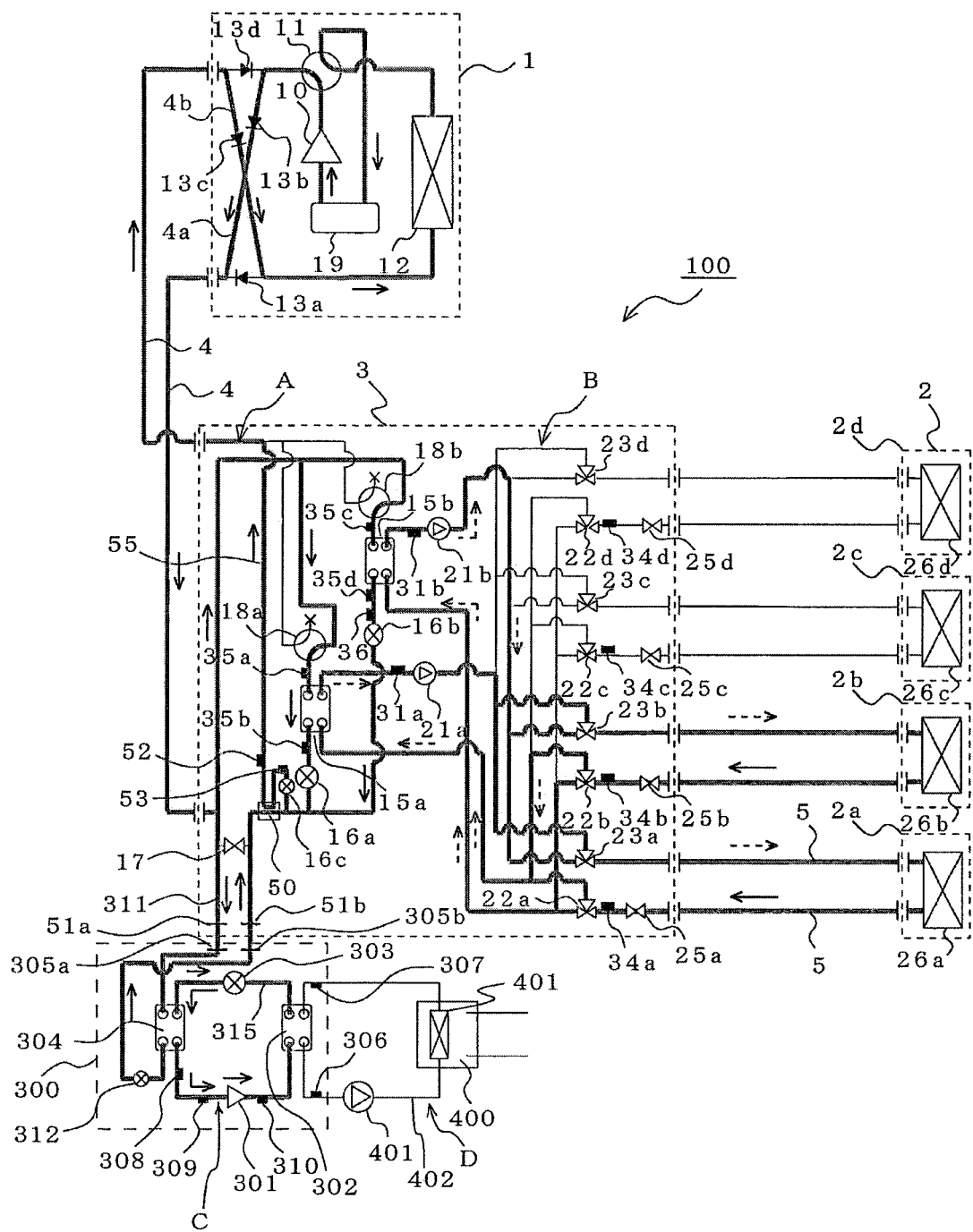
FIG. 5 is a refrigerant circuit diagram illustrating the flow of the refrigerants during a heating only operation mode in the heat pump device according to Embodiment 1 of the present invention.

FIG. 5 is a refrigerant circuit diagram illustrating the flow of the refrigerants during the heating only operation mode in the heat pump device 100. The heating only operation mode in FIG. 5 is directed to an example where heating load is generated only in the use-side heat exchanger 26*a* and the use-side heat exchanger 26*b*. In FIG. 5, pipes denoted by thick lines are pipes through which the refrigerants (i.e., the heat-source-side refrigerant and the water-heating-unit-side refrigerant) and the first heat medium flow. Furthermore, in FIG. 5, the flowing direction of the heat-source-side refrigerant and the water-heating-unit-side refrigerant is denoted by solid arrows, whereas the flowing direction of the first heat medium is denoted by dashed arrows.

In the heating only operation mode shown in FIG. 5, in the outdoor unit 1, the first refrigerant flow switching device 11 is switched so as to cause the heat-source-side refrigerant discharged from the compressor 10 to flow into the heat medium relay unit 3 without traveling through the heat-source-side heat exchanger 12. In the heat medium relay unit 3, the pump 21a and the pump 21b are driven, the heat medium flow control device 25a and the heat medium flow control device 25b are opened, the heat medium flow control device 25c and the heat medium flow control device 25d are completely closed, and the first heat medium is made to circulate between each of the heat exchangers 15a and 15b related to heat medium and the use-side heat exchangers 26a and 26b. In the water heating unit 300, the compressor 301 is driven so that the water-heating-unit-side refrigerant is made to circulate, and the expansion device 312 is set in an open state.

First, the flow of the heat-source-side refrigerant in the refrigerant circuit A will be described.

A low-temperature low-pressure refrigerant is compressed by the compressor 10 so that a high-temperature high-pressure gas refrigerant is discharged therefrom. The high-temperature high-pressure gas refrigerant discharged from the compressor 10 travels through the first refrigerant flow switching device 11, flows through the first connection pipe 4a, and then passes through the check valve 13b so as to flow out from the outdoor unit 1. The high-temperature high-pressure gas refrigerant flowing out from the outdoor unit 1 travels through the refrigerant pipe 4 so as to flow into the heat medium relay unit 3 and the water heating unit 300. The high-temperature high-pressure gas refrigerant flowing into the heat medium relay unit 3 is distributed so as to flow into the heat exchanger 15a related to heat medium and the heat exchanger 15b related to heat medium via the second refrigerant flow switching device 18a and the second refrigerant flow switching device 18b. On the other hand, the high-temperature high-pressure gas refrigerant flowing into the water heating unit 300 flows into the heat exchanger 304.

The high-temperature high-pressure gas refrigerant flowing into the heat exchanger 15a related to heat medium and the heat exchanger 15b related to heat medium condenses and liquefies while transferring heat to the first heat medium circulating through the heat medium circuit B, thereby becoming a high-pressure liquid refrigerant. The liquid refrigerant flowing out from the heat exchanger 15a related to heat medium and the heat exchanger 15b related to heat medium are expanded by the expansion device 16a and the expansion device 16b, thereby becoming a low-temperature low-pressure two-phase refrigerant. This two-phase refrigerant merges with the heat-source-side refrigerant decompressed by the expansion device 312 in the water heating unit 300, travels through the expansion device 16c (in a completely open state), and then flows out from the heat medium relay unit 3 so as to flow back into the outdoor unit 1 via the refrigerant pipe 4. The refrigerant flowing into the outdoor unit 1 flows through the second connection pipe 4b and travels through the check valve 13c so as to flow into the heat-source-side heat exchanger 12 functioning as an evaporator.

The heat-source-side refrigerant flowing into the heat-source-side heat exchanger 12 receives heat from outdoor air at the heat-source-side heat exchanger 12, thereby becoming a low-temperature low-pressure gas refrigerant. The low-temperature low-pressure gas refrigerant flowing out from the heat-source-side heat exchanger 12 is suctioned into the compressor 10 again via the first refrigerant flow switching device 11 and the accumulator 19.

In this case, the opening degree of the expansion device 16a is controlled such that the degree of subcooling obtained as a difference between a value obtained by converting the pressure detected by the first pressure sensor 36 into saturation temperature and the temperature detected by the third temperature sensor 35b is made constant. Similarly, the opening degree of the expansion device 16b is controlled such that the degree of subcooling obtained as a difference between a value obtained by converting the pressure detected by the first pressure sensor 36 into saturation temperature and the temperature detected by the third temperature sensor 35d is made constant. The on-off device 17 is set in a closed state. If the saturation temperature at an intermediate position between the heat exchangers 15 related to heat medium can be measured, the temperature at that intermediate position may be used instead of using the first pressure sensor 36 so that the system can be formed at lower cost.

Next, the flow of the water-heating-unit-side refrigerant in the refrigerant circuit C will be described.

The water-heating-unit-side refrigerant compressed by the compressor 301 becomes a high-temperature high-pressure gas refrigerant, which then flows into the water-heating-unit-side refrigerant passage in the heat exchanger 302. In the heat exchanger 302, the water-heating-unit-side refrigerant exchanges heat with the second heat medium (e.g., hot water) returning from the hot-water storage tank 400 so that the second heat medium is heated to a high temperature and the water-heating-unit-side refrigerant is decreased in temperature (by enthalpy), and then flows out from the heat exchanger 302.

The water-heating-unit-side refrigerant flowing out from the heat exchanger 302 is decompressed by the expansion device 303 so as to become a low-pressure two-phase refrigerant, which then flows into the water-heating-unit-side refrigerant passage in the heat exchanger 304. The water-heating-unit-side refrigerant flowing into the heat exchanger 304 exchanges heat with the heat-source-side refrigerant flowing from the heat medium relay unit 3 via the connection port 51a and the connection port 305a. Then, the heat-source-side refrigerant condenses into a liquid state, whereas the water-heating-unit-side refrigerant evaporates into a gaseous state. The heat-source-side refrigerant condensed into the liquid state is decompressed by the expansion device 312 and is transported to the heat medium relay unit 3 via the connection port 305b and the connection port 51b. The water-heating-unit-side refrigerant in the gaseous state is suctioned into the compressor 301 again.

The reason that the refrigerant circuit C can supply high-temperature water will now be described.

Figure 6:
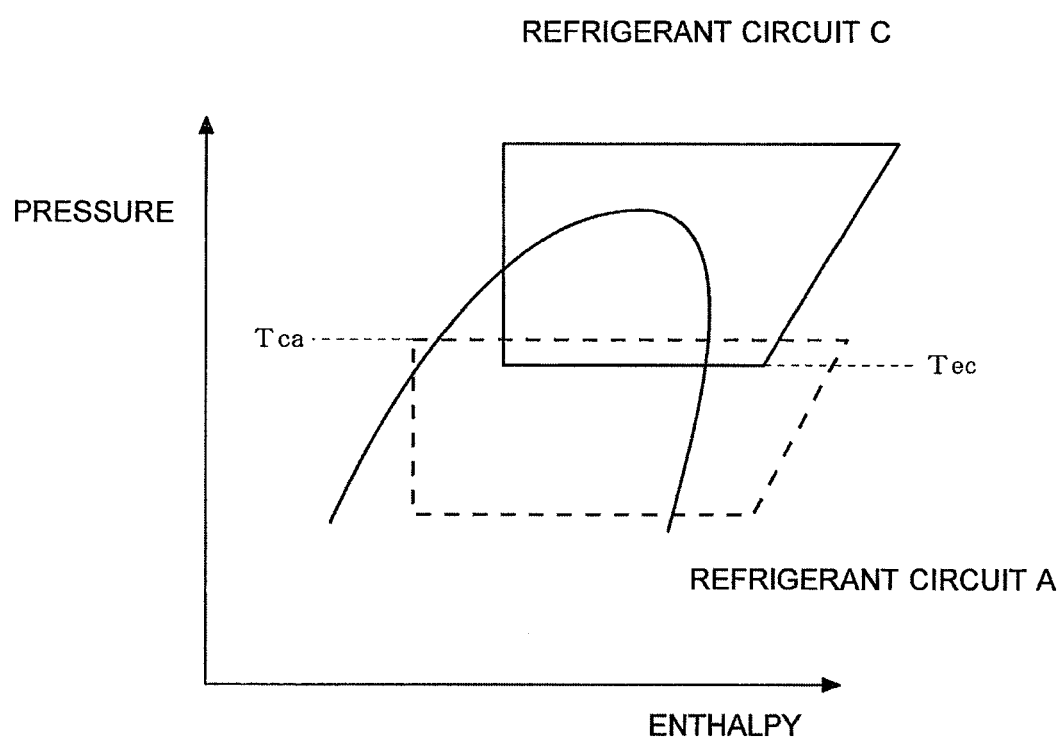
FIG. 6 illustrates operating points of a refrigerant circuit A and a refrigerant circuit C on a P-h line diagram.

FIG. 6 illustrates operating points of the refrigerant circuit A and the refrigerant circuit C on a P-h line diagram. In FIG. 6, a solid line denotes operating points of the refrigerant circuit C, whereas a dashed line denotes operating points of the refrigerant circuit A. In FIG. 6, Tca denotes a condensing temperature in the refrigerant circuit A, whereas Tec denotes an evaporating temperature in the refrigerant circuit C.

The condensing temperature in the refrigerant circuit A at the heat exchanger 302 is, for example, 50° C. In this case, since the refrigeration cycle in the refrigerant circuit C evaporates a refrigerant by utilizing condensation heat in the refrigerant circuit A, a balanced state can be achieved at a high evaporating temperature of about 25° C. Specifically, by increasing the evaporating temperature in the refrigerant circuit C, the condensing temperature in the refrigerant circuit C can also be increased, thereby allowing for a balanced state at a supercritical pressure, as shown in FIG. 6. In a supercritical state, since latent heat does not change as in a normal refrigeration cycle, the refrigerant temperature changes toward the outlet of a heat exchanger.

By forming a binary cycle with the refrigerant circuit A and the refrigerant circuit C in this manner, the water-heatingunit-side refrigerant and the second heat medium, such as water, can exchange heat at a high temperature level, whereby the second heat medium can be heated to a high temperature. If the second heat medium is water, hot water can be output. In the heat exchanger 302, since the sensible heat of the water-heating-unit-side refrigerant in the refrigerant circuit C changes, the water-heating-unit-side refrigerant and the second heat medium can efficiently exchange heat by making them flow in a countercurrent manner.

The second heat medium heated to a high temperature by the heat exchanger 302 is transported to the hot-water storage tank 400 by the water transport unit 401. A heat exchanger 410 may be provided in the hot-water storage tank 400. Thus, the second heat medium heated to a high temperature by the water heating unit 300 may be transported to the heat exchanger 410 so that the second heat medium stored in the hot-water storage tank 400 can be indirectly heated. The second heat medium stored in the hot-water storage tank 400 is supplied to the use side. Although a description of the use side will be omitted here, the second heat medium is used for hot water supply or floor heating or the like.

Next, the flow of the first heat medium in the heat medium circuit B will be described.

In the heating only operation mode, the heating energy of the heat-source-side refrigerant is transferred to the first heat medium at both the heat exchanger 15a related to heat medium and the heat exchanger 15b related to heat medium, and the heated first heat medium is made to flow through the pipes 5 by the pump 21a and the pump 21b. The first heat medium pressurized in and flowing out from the pump 21a and the pump 21b flows into the use-side heat exchanger 26a and the use-side heat exchanger 26b via the second heat medium flow switching device 23a and the second heat medium flow switching device 23b. Then, the first heat medium transfers heat to indoor air at the use-side heat exchanger 26a and the use-side heat exchanger 26b, thereby heating the indoor space 7.

Subsequently, the first heat medium flows out from the use-side heat exchanger 26a and the use-side heat exchanger 26b and then flows into the heat medium flow control device 25a and the heat medium flow control device 25b. In this case, with the functions of the heat medium flow control device 25a and the heat medium flow control device 25b, the amount of first heat medium flowing into the use-side heat exchanger 26a and the use-side heat exchanger 26b is controlled to be an amount that is sufficient to cover the air-conditioning load required in the indoor space. The first heat medium flowing out from the heat medium flow control device 25a and the heat medium flow control device 25b travels through the first heat medium flow switching device 22a and the first heat medium flow switching device 22b so as to flow into the heat exchanger 15a related to heat medium and the heat exchanger 15b related to heat medium, and is suctioned into the pump 21a and the pump 21b again.

In the pipes 5 for the use-side heat exchangers 26, the first heat medium flows in the direction from the second heat medium flow switching devices 23 toward the first heat medium flow switching devices 22 via the heat medium flow control devices 25. The air-conditioning load required in the indoor space 7 can be covered by performing control such that a difference between the temperature detected by the first temperature sensor 31a or the temperature detected by the first temperature sensor 31b and the temperature detected by each of the second temperature sensors 34 is maintained as a target value. The outlet temperature of the heat exchangers 15 related to heat medium may be the temperature of the first temperature sensor 31a or the first temperature sensor 31b or may be an average temperature of these sensors.

In this case, the first heat medium flow switching devices 22 and the second heat medium flow switching devices 23 are controlled to intermediate opening degrees so that passages extending to both the heat exchanger 15a related to heat medium and the heat exchanger 15b related to heat medium are ensured. Furthermore, although each use-side heat exchanger 26 should be controlled based on a temperature difference between the inlet and the outlet thereof, the heat-medium temperature at the inlet side of the use-side heat exchanger 26 is almost the same as the temperature detected by the first temperature sensor 31b. Therefore, by using the first temperature sensor 31b, the number of temperature sensors can be reduced, whereby the system can be formed at low cost.

In case of executing the heating only operation mode, since it is not necessary to make the first heat medium flow to use-side heat exchangers 26 with no air-conditioning load (including those in a thermostat-off state), the passages therefor are closed by the corresponding heat medium flow control devices 25, thereby preventing the first heat medium from flowing toward the use-side heat exchangers 26. In FIG. 5, since there is air-conditioning load in the use-side heat exchanger 26a and the use-side heat exchanger 26b, the first heat medium is made to flow into these heat exchangers. In contrast, since there is no air-conditioning load in the use-side heat exchanger 26c and the use-side heat exchanger 26d, the corresponding heat medium flow control device 25c and the corresponding heat medium flow control device 25d are completely closed. If air-conditioning load is generated from the use-side heat exchanger 26c or the use-side heat exchanger 26d, the heat medium flow control device 25c or the heat medium flow control device 25d may be opened so as to circulate the first heat medium.

[Cooling Main Operation Mode]

Figure 7:
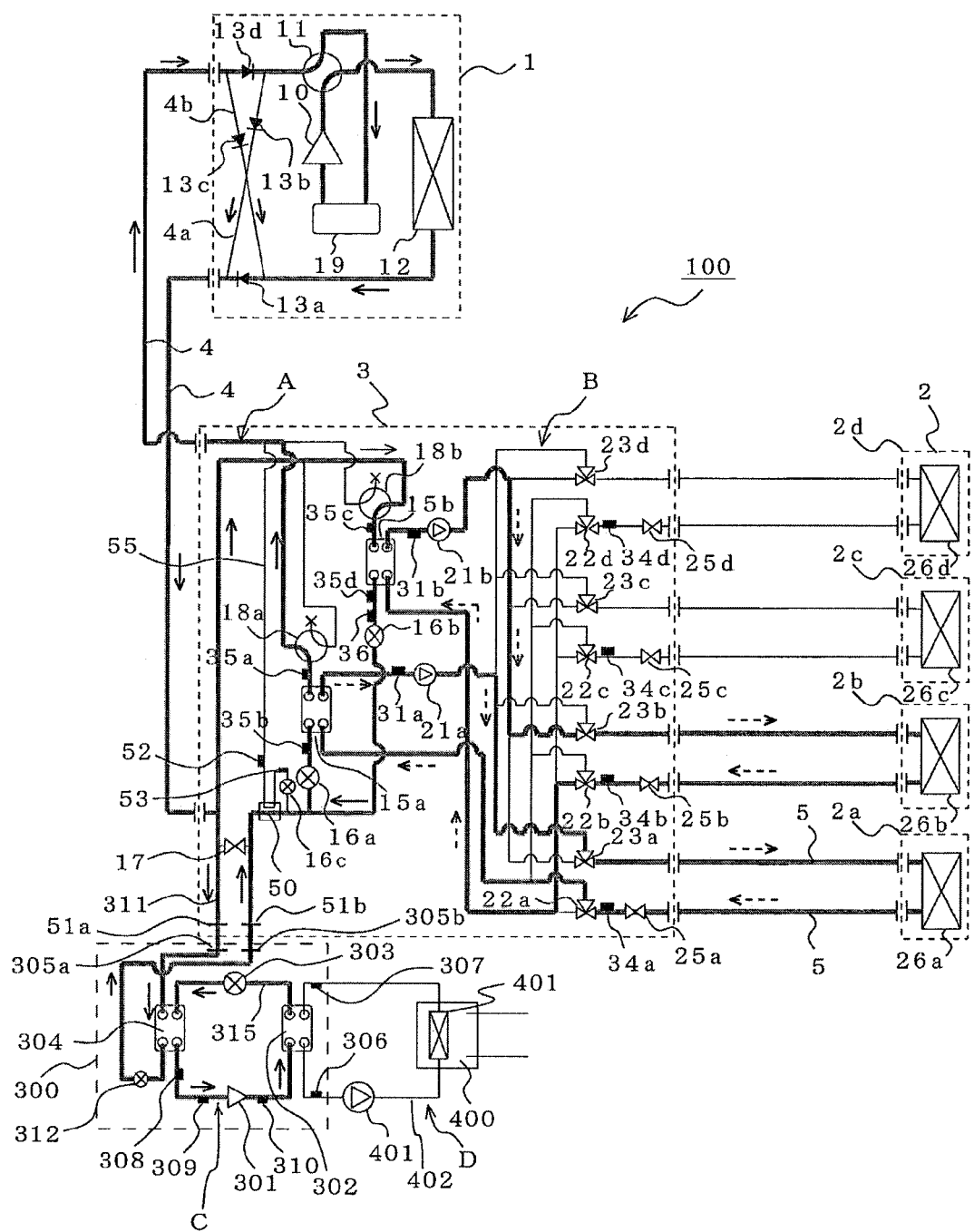
FIG. 7 is a refrigerant circuit diagram illustrating the flow of the refrigerants during a cooling main operation mode in the heat pump device according to Embodiment 1 of the present invention.

FIG. 7 is a refrigerant circuit diagram illustrating the flow of the refrigerants during the cooling main operation mode in the heat pump device 100. The cooling main operation mode in FIG. 7 is directed to an example where cooling load is generated in the use-side heat exchanger 26a and heating load is generated in the use-side heat exchanger 26b. In FIG. 7, pipes denoted by thick lines are pipes through which the refrigerants (i.e., the heat-source-side refrigerant and the water-heating-unit-side refrigerant) and the first heat medium flow. Furthermore, in FIG. 7, the flowing direction of the heat-source-side refrigerant and the water-heating-unit-side refrigerant is denoted by solid arrows, whereas the flowing direction of the first heat medium is denoted by dashed arrows.

In the cooling main operation mode shown in FIG. 7, in the outdoor unit 1, the first refrigerant flow switching device 11 is switched so as to cause the heat-source-side refrigerant discharged from the compressor 10 to flow into the heat-source-side heat exchanger 12. In the heat medium relay unit 3, the pump 21a and the pump 21b are driven, the heat medium flow control device 25a and the heat medium flow control device 25b are opened, and the heat medium flow control device 25c and the heat medium flow control device 25d are completely closed. The first heat medium is made to circulate between the heat exchanger 15a related to heat medium and the use-side heat exchanger 26a, as well as between the heat exchanger 15b related to heat medium and the use-side heat exchanger 26b. In the water heating unit 300, the compressor 301 is driven so that the water-heating-unit-side refrigerant is made to circulate, and the expansion device 312 is set in an open state.

First, the flow of the heat-source-side refrigerant in the refrigerant circuit A will be described.

A low-temperature low-pressure refrigerant is compressed by the compressor 10 so that a high-temperature high-pressure gas refrigerant is discharged therefrom. The high-temperature high-pressure gas refrigerant discharged from the compressor 10 flows into the heat-source-side heat exchanger 12 via the first refrigerant flow switching device 11. Then, the high-temperature high-pressure gas refrigerant condenses at the heat-source-side heat exchanger 12 while transferring heat to outdoor air, thereby becoming a two-phase refrigerant. The two-phase refrigerant flowing out from the heat-source-side heat exchanger 12 travels through the check valve 13a so as to flow out from the outdoor unit 1, and then travels through the refrigerant pipe 4 so as to flow into the heat medium relay unit 3 and the water heating unit 300. The two-phase refrigerant flowing into the heat medium relay unit 3 travels through the second refrigerant flow switching device 18b so as to flow into the heat exchanger 15b related to heat medium functioning as a condenser. On the other hand, the high-pressure two-phase refrigerant flowing into the water heating unit 300 flows into the heat exchanger 304.

The two-phase refrigerant flowing into the heat exchanger 15b related to heat medium condenses and liquefies while transferring heat to the first heat medium circulating through the heat medium circuit B, thereby becoming a liquid refrigerant. The liquid refrigerant flowing out from the heat exchanger 15b related to heat medium is expanded by the expansion device 16b, thereby becoming a low-pressure two-phase refrigerant. This low-pressure two-phase refrigerant merges with the refrigerant decompressed by the expansion device 312 in the water heating unit 300 and flows into the heat exchanger 15a related to heat medium functioning as an evaporator via the expansion device 16a. The low-pressure two-phase refrigerant flowing into the heat exchanger 15a related to heat medium receives heat from the first heat medium circulating through the heat medium circuit B so as to become a low-pressure gas refrigerant while cooling the first heat medium. This gas refrigerant flows out from the heat exchanger 15a related to heat medium, flows out from the heat medium relay unit 3 via the second refrigerant flow switching device 18a, and then travels through the refrigerant pipe 4 so as to flow back into the outdoor unit 1. The heat-source-side refrigerant flowing into the outdoor unit 1 travels through the check valve 13d and is suctioned into the compressor 10 again via the first refrigerant flow switching device 11 and the accumulator 19.

In this case, the opening degree of the expansion device 16b is controlled such that the degree of superheat obtained as a difference between the temperature detected by the third temperature sensor 35a and the temperature detected by the third temperature sensor 35b is made constant. The expansion device 16a is set in a completely open state, the on-off device 17 is set in a closed state, and the expansion device 16c is set in a closed state. Alternatively, the opening degree of the expansion device 16b may be controlled such that the degree of subcooling obtained as a difference between a value obtained by converting the pressure detected by the first pressure sensor 36 into saturation temperature and the temperature detected by the third temperature sensor 35d is made constant. Furthermore, the expansion device 16b may be set in a completely open state, and the degree of superheat or the degree of subcooling may be controlled with the expansion device 16a.

Next, the flow of the water-heating-unit-side refrigerant in the refrigerant circuit C will be described.

The water-heating-unit-side refrigerant compressed by the compressor 301 becomes a high-temperature high-pressure gas refrigerant, which then flows into the water-heating-unit-side refrigerant passage in the heat exchanger 302. In the heat exchanger 302, the water-heating-unit-side refrigerant exchanges heat with the second heat medium (e.g., hot water) returning from the hot-water storage tank 400 so that the second heat medium is heated to a high temperature and the water-heating-unit-side refrigerant is decreased in temperature (by enthalpy), and then flows out from the heat exchanger 302.

The water-heating-unit-side refrigerant flowing out from the heat exchanger 302 is decompressed by the expansion device 303 so as to become a low-pressure two-phase refrigerant, which then flows into the water-heating-unit-side refrigerant passage in the heat exchanger 304. The water-heating-unit-side refrigerant flowing into the heat exchanger 304 exchanges heat with the heat-source-side refrigerant flowing from the heat medium relay unit 3 via the connection port 51a and the connection port 305a. Then, the heat-source-side refrigerant condenses into a liquid state, whereas the water-heating-unit-side refrigerant evaporates into a gaseous state. The heat-source-side refrigerant condensed into the liquid state is decompressed by the expansion device 312 and is transported to the heat medium relay unit 3 via the connection port 305b and the connection port 51b. The water-heating-unit-side refrigerant in the gaseous state is suctioned into the compressor 301 again.

Next, the flow of the first heat medium in the heat medium circuit B will be described.

In the cooling main operation mode, the heating energy of the heat-source-side refrigerant is transferred to the first heat medium at the heat exchanger 15b related to heat medium, and the heated first heat medium is made to flow through the corresponding pipe 5 by the pump 21b. Furthermore, in the cooling main operation mode, the cooling energy of the heat-source-side refrigerant is transferred to the first heat medium at the heat exchanger 15a related to heat medium, and the cooled first heat medium is made to flow through the corresponding pipe 5 by the pump 21a. The first heat medium pressurized in and flowing out from the pump 21b flows into the use-side heat exchanger 26b via the second heat medium flow switching device 23b. The first heat medium pressurized in and flowing out from the pump 21a flows into the use-side heat exchanger 26a via the second heat medium flow switching device 23a.

The first heat medium transfers heat to indoor air at the use-side heat exchanger 26b, thereby heating the indoor space 7. Furthermore, the first heat medium receives heat from indoor air at the use-side heat exchanger 26a, thereby cooling the indoor space 7. In this case, with the functions of the heat medium flow control device 25a and the heat medium flow control device 25b, the amount of first heat medium flowing into the use-side heat exchanger 26a and the use-side heat exchanger 26b is controlled to be an amount that is sufficient to cover the air-conditioning load required in the indoor space. The first heat medium slightly decreased in temperature after passing through the use-side heat exchanger 26b travels through the heat medium flow control device 25b and the first heat medium flow switching device 22b so as to flow into heat exchanger 15b related to heat medium, and is suctioned into the pump 21b again. The first heat medium slightly increased in temperature after passing through the use-side heat exchanger 26a travels through the heat medium flow control device 25a and the first heat medium flow switching device 22a so as to flow into the heat exchanger 15a related to heat medium, and is suctioned into the pump 21a again.

During this time, with the functions of the first heat medium flow switching devices 22 and the second heat medium flow switching devices 23, the warm first heat medium and the cool first heat medium are introduced, without mixing, into the use-side heat exchangers 26 with the heating load and the cooling load, respectively. In the pipes 5 for the use-side heat exchangers 26, both the heating one and the cooling one of the first heat medium flow in the direction from the second heat medium flow switching devices 23 toward the first heat medium flow switching devices 22 via the heat medium flow control devices 25. The air-conditioning load required in the indoor space 7 can be covered by performing control such that a difference between the temperature detected by the first temperature sensor 31b and the temperature detected by the second temperature sensor 34 is maintained as a target value at the heating side, and a difference between the temperature detected by the second temperature sensor 34 and the temperature detected by the first temperature sensor 31a is maintained as a target value at the cooling side.

In case of executing the cooling main operation mode, since it is not necessary to make the first heat medium flow to use-side heat exchangers 26 with no air-conditioning load (including those in a thermostat-off state), the passages therefor are closed by the corresponding heat medium flow control devices 25, thereby preventing the first heat medium from flowing toward the use-side heat exchangers 26. In FIG. 7, since there is air-conditioning load in the use-side heat exchanger 26a and the use-side heat exchanger 26b, the first heat medium is made to flow into these heat exchangers. In contrast, since there is no air-conditioning load in the use-side heat exchanger 26c and the use-side heat exchanger 26d, the corresponding heat medium flow control device 25c and the corresponding heat medium flow control device 25d are completely closed. If air-conditioning load is generated from the use-side heat exchanger 26c or the use-side heat exchanger 26d, the heat medium flow control device 25c or the heat medium flow control device 25d may be opened so as to circulate the first heat medium.

[Heating Main Operation Mode]

Figure 8:
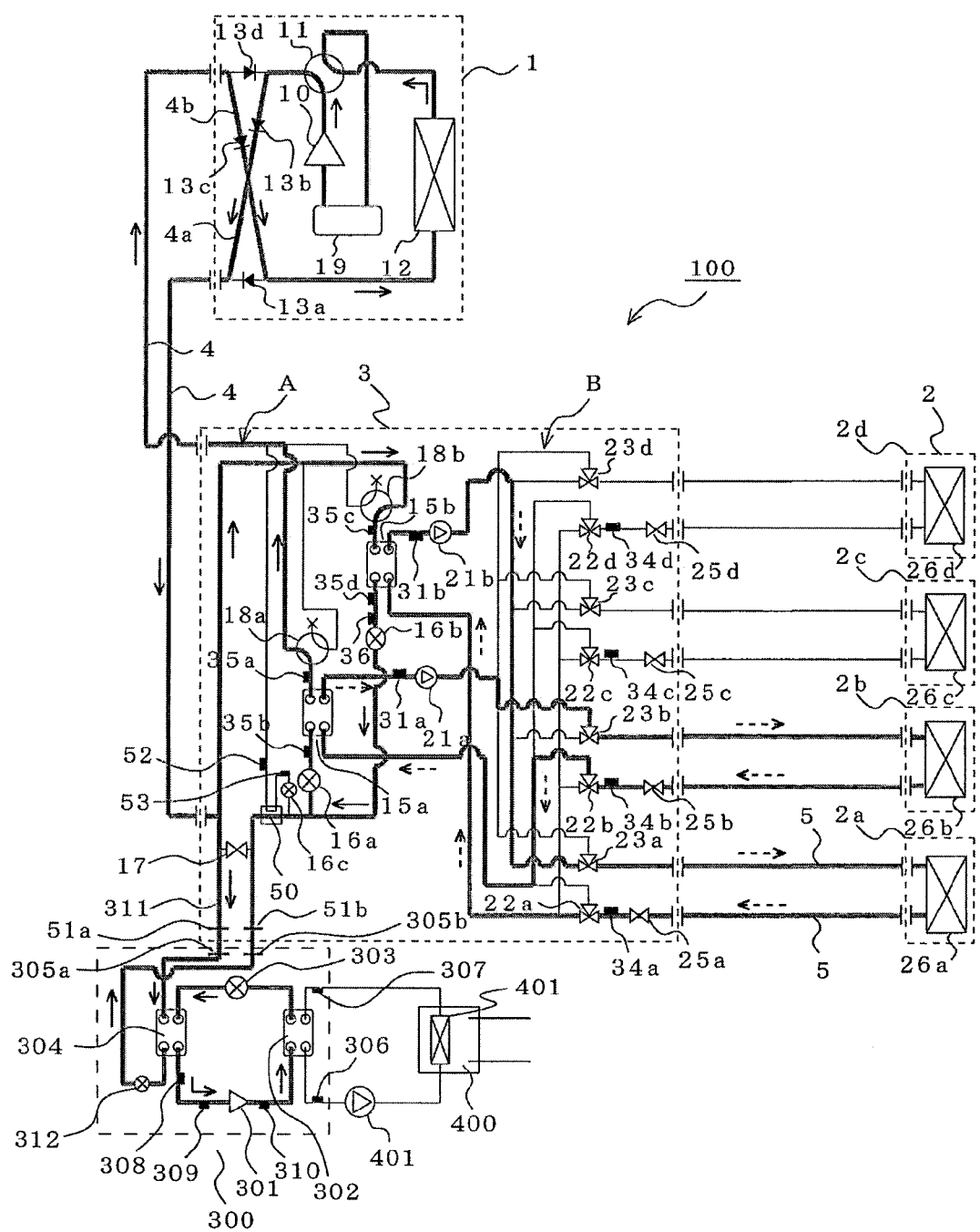
FIG. 8 is a refrigerant circuit diagram illustrating the flow of the refrigerants during a heating main operation mode in the heat pump device according to Embodiment 1 of the present invention.

FIG. 8 is a refrigerant circuit diagram illustrating the flow of the refrigerants during the heating main operation mode in the heat pump device 100. The heating main operation mode in FIG. 8 is directed to an example where heating load is generated in the use-side heat exchanger 26a and cooling load is generated in the use-side heat exchanger 26b. In FIG. 8, pipes denoted by thick lines are pipes through which the refrigerants (i.e., the heat-source-side refrigerant and the water-heating-unit-side refrigerant) and the first heat medium flow. Furthermore, in FIG. 7, the flowing direction of the heat-source-side refrigerant and the water-heating-unit-side refrigerant is denoted by solid arrows, whereas the flowing direction of the first heat medium is denoted by dashed arrows.

In the heating main operation mode shown in FIG. 8, in the outdoor unit 1, the first refrigerant flow switching device 11 is switched so as to cause the heat-source-side refrigerant discharged from the compressor 10 to flow into the heat medium relay unit 3 without traveling through the heat-source-side heat exchanger 12. In the heat medium relay unit 3, the pump 21a and the pump 21b are driven, the heat medium flow control device 25a and the heat medium flow control device 25b are opened, and the heat medium flow control device 25c and the heat medium flow control device 25d are completely closed. The first heat medium is made to circulate between the heat exchanger 15a related to heat medium and the use-side heat exchanger 26b, as well as between the heat exchanger 15b related to heat medium and the use-side heat exchanger 26a. In the water heating unit 300, the compressor 301 is driven so that the water-heating-unit-side refrigerant is made to circulate, and the expansion device 312 is set in an open state.

First, the flow of the heat-source-side refrigerant in the refrigerant circuit A will be described.

A low-temperature low-pressure refrigerant is compressed by the compressor 10 so that a high-temperature high-pressure gas refrigerant is discharged therefrom. The high-temperature high-pressure gas refrigerant discharged from the compressor 10 travels through the first refrigerant flow switching device 11, flows through the first connection pipe 4a, and then passes through the check valve 13b so as to flow out from the outdoor unit 1. The high-temperature high-pressure gas refrigerant flowing out from the outdoor unit 1 travels through the refrigerant pipe 4 so as to flow into the heat medium relay unit 3 and the water heating unit 300. The high-temperature high-pressure gas refrigerant flowing into the heat medium relay unit 3 travels through the second refrigerant flow switching device 18b so as to flow into the heat exchanger 15b related to heat medium functioning as a condenser. On the other hand, the high-temperature high-pressure gas refrigerant flowing into the water heating unit 300 flows into the heat exchanger 304.

The gas refrigerant flowing into the heat exchanger 15b related to heat medium condenses and liquefies while transferring heat to the first heat medium circulating through the heat medium circuit B, thereby becoming a liquid refrigerant. The liquid refrigerant flowing out from the heat exchanger 15b related to heat medium is expanded by the expansion device 16b, thereby becoming a low-pressure two-phase refrigerant. This low-pressure two-phase refrigerant merges with the refrigerant decompressed by the expansion device 312 in the water heating unit 300 and flows into the heat exchanger 15a related to heat medium functioning as an evaporator via the expansion device 16a. The low-pressure two-phase refrigerant flowing into the heat exchanger 15a related to heat medium evaporates by receiving heat from the first heat medium circulating through the heat medium circuit B, thereby cooling the first heat medium. This low-pressure two-phase refrigerant flows out from the heat exchanger 15a related to heat medium, flows out from the heat medium relay unit 3 via the second refrigerant flow switching device 18a, and then travels through the refrigerant pipe 4 so as to flow back into the outdoor unit 1.

The heat-source-side refrigerant flowing into the outdoor unit 1 travels through the check valve 13c so as to flow into the heat-source-side heat exchanger 12 functioning as an evaporator. Then, the refrigerant flowing into the heat-source-side heat exchanger 12 receives heat from outdoor air at the heat-source-side heat exchanger 12, thereby becoming a low-temperature low-pressure gas refrigerant. The low-temperature low-pressure gas refrigerant flowing out from the heat-source-side heat exchanger 12 is suctioned into the compressor 10 again via the first refrigerant flow switching device 11 and the accumulator 19.

In this case, the opening degree of the expansion device 16b is controlled such that the degree of subcooling obtained as a difference between a value obtained by converting the pressure detected by the first pressure sensor 36 into saturation temperature and the temperature detected by the third temperature sensor 35b is made constant. The expansion device 16a is set in a completely open state, the on-off device 17 is set in a closed state, and the expansion device 16c is set in a closed state. Furthermore, the expansion device 16b may be set in a completely open state, and the degree of subcooling may be controlled with the expansion device 16a.

Next, the flow of the water-heating-unit-side refrigerant in the refrigerant circuit C will be described.

The water-heating-unit-side refrigerant compressed by the compressor 301 becomes a high-temperature high-pressure gas refrigerant, which then flows into the water-heating-unit-side refrigerant passage in the heat exchanger 302. In the heat exchanger 302, the water-heating-unit-side refrigerant exchanges heat with the second heat medium (e.g., hot water) returning from the hot-water storage tank 400 so that the second heat medium is heated to a high temperature and the water-heating-unit-side refrigerant is decreased in temperature (by enthalpy), and then flows out from the heat exchanger 302.

The water-heating-unit-side refrigerant flowing out from the heat exchanger 302 is decompressed by the expansion device 303 so as to become a low-pressure two-phase refrigerant, which then flows into the water-heating-unit-side refrigerant passage in the heat exchanger 304. The water-heating-unit-side refrigerant flowing into the heat exchanger 304 exchanges heat with the heat-source-side refrigerant flowing from the heat medium relay unit 3 via the connection port 51a and the connection port 305a. Then, the heat-source-side refrigerant condenses into a liquid state, whereas the water-heating-unit-side refrigerant evaporates into a gaseous state. The heat-source-side refrigerant condensed into the liquid state is decompressed by the expansion device 312 and is transported to the heat medium relay unit 3 via the connection port 305b and the connection port 51b. The water-heating-unit-side refrigerant in the gaseous state is suctioned into the compressor 301 again.

Next, the flow of the first heat medium in the heat medium circuit B will be described.

In the heating main operation mode, the heating energy of the heat-source-side refrigerant is transferred to the first heat medium at the heat exchanger 15b related to heat medium, and the heated first heat medium is made to flow through the corresponding pipe 5 by the pump 21b. Furthermore, in the heating main operation mode, the cooling energy of the heat-source-side refrigerant is transferred to the first heat medium at the heat exchanger 15a related to heat medium, and the cooled first heat medium is made to flow through the corresponding pipe 5 by the pump 21a. The first heat medium pressurized in and flowing out from the pump 21b flows into the use-side heat exchanger 26a via the second heat medium flow switching device 23a. The first heat medium pressurized in and flowing out from the pump 21a flows into the use-side heat exchanger 26b via the second heat medium flow switching device 23b.

The first heat medium receives heat from indoor air at the use-side heat exchanger 26b, thereby cooling the indoor space 7. Furthermore, the first heat medium transfers heat to indoor air at the use-side heat exchanger 26a, thereby heating the indoor space 7. In this case, with the functions of the heat medium flow control device 25a and the heat medium flow control device 25b, the amount of first heat medium flowing into the use-side heat exchanger 26a and the use-side heat exchanger 26b is controlled to be an amount that is sufficient to cover the air-conditioning load required in the indoor space. The first heat medium slightly decreased in temperature after passing through the use-side heat exchanger 26b travels through the heat medium flow control device 25a and the first heat medium flow switching device 22a so as to flow into the heat exchanger 15a related to heat medium, and is suctioned into the pump 21a again. The first heat medium slightly increased in temperature after passing through the use-side heat exchanger 26a travels through the heat medium flow control device 25a and the first heat medium flow switching device 22a so as to flow into the heat exchanger 15b related to heat medium, and is suctioned into the pump 21b again.

During this time, with the functions of the first heat medium flow switching devices 22 and the second heat medium flow switching devices 23, the warm first heat medium and the cool first heat medium are introduced, without mixing, into the use-side heat exchangers 26 with the heating load and the cooling load, respectively. In the pipes 5 for the use-side heat exchangers 26, both the heating one and the cooling one of the first heat medium flow in the direction from the second heat medium flow switching devices 23 toward the first heat medium flow switching devices 22 via the heat medium flow control devices 25. The air-conditioning load required in the indoor space 7 can be covered by performing control such that a difference between the temperature detected by the first temperature sensor 31b and the temperature detected by the second temperature sensor 34 is maintained as a target value at the heating side, and a difference between the temperature detected by the second temperature sensor 34 and the temperature detected by the first temperature sensor 31a is maintained as a target value at the cooling side.

In case of executing the heating main operation mode, since it is not necessary to make the first heat medium flow to use-side heat exchangers 26 with no air-conditioning load (including those in a thermostat-off state), the passages therefor are closed by the corresponding heat medium flow control devices 25, thereby preventing the first heat medium from flowing toward the use-side heat exchangers 26. In FIG. 8, since there is air-conditioning load in the use-side heat exchanger 26a and the use-side heat exchanger 26b, the first heat medium is made to flow into these heat exchangers. In contrast, since there is no air-conditioning load in the use-side heat exchanger 26c and the use-side heat exchanger 26d, the corresponding heat medium flow control device 25c and the corresponding heat medium flow control device 25d are completely closed. If air-conditioning load is generated from the use-side heat exchanger 26c or the use-side heat exchanger 26d, the heat medium flow control device 25c or the heat medium flow control device 25d may be opened so as to circulate the first heat medium.

[Refrigerant Pipes 4 and Refrigerant Pipes 311]

As described above, the heat pump device 100 according to Embodiment 1 has several operation modes. In these operation modes, a heat-source-side refrigerant (i.e., a first refrigerant) flows through the refrigerant pipes 4 and the refrigerant pipes 311 that connect the outdoor unit 1, the heat medium relay unit 3, and the water heating unit 300.

[Pipes 5]

In the several operation modes executed by the heat pump device 100 according to Embodiment 1, a heat medium (i.e., a first heat medium), such as water or antifreeze, flows through the pipes 5 that connect the heat medium relay unit 3 and the indoor units 2.

[Refrigerant Pipes 315]

In the several operation modes executed by the heat pump device 100 according to Embodiment 1, a water-heating-unit-side refrigerant (i.e., a second refrigerant) flows through the refrigerant pipes 315 that connect the various components constituting the refrigerant circuit C.

[Pipes 402]

In the several operation modes executed by the heat pump device 100 according to Embodiment 1, a heat medium (i.e., a second heat medium), such as water or antifreeze, flows through the pipes 402 that connect the various components constituting the hot-water storage circuit D.

[Heat-Source-Side Refrigerant]

Examples of the heat-source-side refrigerant circulating through the refrigerant circuit A include a pure refrigerant, such as R-22, R-134a, or R-32; a near-azeotropic refrigerant mixture, such as R-410A or R-404A; a non-zeotropic refrigerant mixture, such as R-407C; tetrafluoropropene (HFO-1234yf or HFO-1234ze), which is a refrigerant that includes a double bond in the chemical formula, is expressed by $C_3H_2F_4$, and has a relatively low global warming potential, or a mixture of the above; and a natural refrigerant, such as $CO_2$ or propane. In view of the effects on the global environment, it is desirable to use R-32 or a refrigerant mixture containing R-32 and tetrafluoropropene (HFO-1234yf or HFO-1234ze), which have a low global warming potential.

[Water-Heating-Unit-Side Refrigerant]

As the water-heating-unit-side refrigerant circulating through the refrigerant circuit C, a refrigerant similar to the heat-source-side refrigerant circulating through the refrigerant circuit A may be used.

However, as described above in each of the operation modes, since the refrigerant circuit C serves as an upper-stage secondary-loop refrigeration cycle, a refrigerant in a low pressure range, such as a low-pressure refrigerant (e.g., HFO-1234yf or HFO-1234ze) with a pressure level equal to or lower than the pressure (i.e., maximum pressure) of R-134a may be used so that problems related to pressure resistance can be solved and the product cost can be minimized. The heat-source-side refrigerant and the water-heating-unit-side refrigerant are independent of each other and do not mix with each other. Moreover, the same kind of refrigerant or different kinds of refrigerants may be used as the heat-source-side refrigerant and the water-heating-unit-side refrigerant. Embodiment 1 is directed to an example where R410A is used in the refrigerant circuit A, and R134a is used in the refrigerant circuit C.

[First Heat Medium]

As the first heat medium, brine (i.e., antifreeze), water, a mixture of brine and water, a mixture of water and an additive with a high anti-corrosion effect, or the like may be used. Therefore, in the heat pump device 100, even if the first heat medium leaks into the indoor space 7 via the indoor units 2, the first heat medium contributes to improved safety since a highly safe heat medium is used as the first heat medium.

[Second Heat Medium]

The second heat medium may be the same kind of heat medium as the first heat medium. However, the heat medium to be stored in the hot-water storage tank 400 is preferably water. The first heat medium is independent of the first heat medium and does not mix therewith. Moreover, the same kind of heat medium or different kinds of heat media may be used as the second heat medium and the first heat medium.

If a controller that controls the water heating unit 300 is included in the water heating unit 300, the controller may be wired or wirelessly connected to controllers (not shown) provided in the heat medium relay unit 3 and the outdoor unit 1 in a communicable manner. The controllers may perform cooperative control by communicating with each other and determining the operation of each of the units. For example, the cooling only operation mode includes a mode (i.e., the cooling only operation mode 1) in which the water heating unit 300 is driven and a mode (i.e., the cooling only operation mode 2) in which the water heating unit 300 is not driven, and the flow of the heat-source-side refrigerant is determined in accordance with the selected mode.

In the heat pump device 100, when only heating load or only cooling load is generated in the use-side heat exchangers 26, the corresponding first heat medium flow switching devices 22 and the corresponding second heat medium flow switching devices 23 are set to intermediate opening degrees so that the heat medium is made to flow to both the heat exchanger 15a related to heat medium and the heat exchanger 15b related to heat medium. Consequently, since both the heat exchanger 15a related to heat medium and the heat exchanger 15b related to heat medium can be used for the heating operation or the cooling operation, the heat transfer area is increased, whereby the heating operation or the cooling operation can be performed efficiently.

When heating load and cooling load are generated in a mixed fashion in the use-side heat exchangers 26, the first heat medium flow switching device 22 and the second heat medium flow switching device 23 that correspond to the use-side heat exchanger 26 performing the heating operation are switched to the passage connected to the heat exchanger 15b related to heat medium for heating, whereas the first heat medium flow switching device 22 and the second heat medium flow switching device 23 that correspond to the use-side heat exchanger 26 performing the cooling operation are switched to the passage connected to the heat exchanger 15a related to heat medium for cooling, whereby the heating operation or the cooling operation can be freely performed in each indoor units 2.

The first heat medium flow switching devices 22 and the second heat medium flow switching devices 23 described in Embodiment 1 may each be a device that can switch passages, such as a device that can switch a three-way passage, like a three-way valve, or a combination of two devices, like two on-off valves, which can open and close two-way passages. Alternatively, the first heat medium flow switching devices 22 and the second heat medium flow switching devices 23 may each be a device that can change the flow rate in a three-way passage, such as a stepping-motor-driven mixing valve, or a combination of two devices, such as electronic expansion valves, which can change the flow rate in two-way passages. In this case, the occurrence of water hammer caused by sudden opening or closing of a passage can also be prevented. Furthermore, although the heat medium flow control devices 25 are described as being two-way valves as an example in Embodiment 1, the heat medium flow control devices 25 may each be a control valve having a three-way passage and may each be installed together with a bypass that bypasses the corresponding use-side heat exchanger 26.

Alternatively, the heat medium flow control devices 25 may each be of a stepping-motor-driven type that can control the flow rate in a passage, or may each be a two-way valve or a three-way valve with one closed end. As another alternative, the heat medium flow control devices 25 may each be a device, such as an on-off valve, which opens and closes a two-way passage and repeats the opening-and-closing operation so as to control the average flow rate.

Although the second refrigerant flow switching devices 18 are described as being four-way valves, each of the second refrigerant flow switching devices 18 may alternatively be constituted of a plurality of two-way passage switching valves or three-way passage switching valves such that the refrigerant is made to flow therethrough in the same manner.

Although the heat pump device 100 according to Embodiment 1 is described as being of a type that can perform a cooling and heating mixed operation, the heat pump device 100 is not limited to such a type. Similar advantages can be achieved even in a configuration that can only perform a cooling operation or a heating operation by having a single heat exchanger 15 related to heat medium and a single first expansion device 16, and a plurality of use-side heat exchangers 26 and a plurality of heat medium flow control devices 25 that are connected in parallel thereto.

It is needless to say that the same applies to a case where only a single use-side heat exchanger 26 and a single heat medium flow control device 25 are connected. Moreover, there are obviously no problems even if a plurality of heat exchangers 15 related to heat medium that operate identically and a plurality of first expansion devices 16 that operate identically are installed. Furthermore, although the heat medium flow control devices 25 are described as being contained in the heat medium relay unit 3 as an example, the heat medium flow control devices 25 may alternatively be contained in the indoor units 2 or be independent of the heat medium relay unit 3 and the indoor units 2.

Although the heat pump device 100 is described as having the accumulator 19 as an example in Embodiment 1, the accumulator 19 does not necessarily need to be provided. Furthermore, air-sending devices are generally attached to the heat-source-side heat exchanger 12 and the use-side heat exchangers 26 and are often used for facilitating condensation or evaporation by blowing air; alternatively, for example, the use-side heat exchangers 26 may be panel heaters or the like that utilize radiation, and the heat-source-side heat exchanger 12 may be of a water-cooled type that moves heat by using water or antifreeze. Specifically, the heat-source-side heat exchanger 12 and the use-side heat exchangers 26 may be of any type with a structure that can transfer or receive heat.

Although there are four use-side heat exchangers 26 provided as an example in Embodiment 1, the number thereof is not limited in particular. Furthermore, although there are two heat exchangers 15a and 15b related to heat medium provided as an example, the number thereof is not limited thereto; any number thereof may be installed so long as they can cool and/or heat the heat medium. Moreover, although a single pump 21a and a single pump 21b are provided, a plurality of small-capacity pumps may be connected in parallel to each other.

Accordingly, the heat pump device 100 according to Embodiment 1 not only achieves improved safety by not making the heat-source-side refrigerant circulate to the indoor units 2 or the vicinity of the indoor units 2, but also achieves further improved safety since the heat medium leaking from connection sections between the pipes 5 and the actuators (i.e., the pumps 21, the first heat medium flow switching devices 22, the second heat medium flow switching devices, the first expansion devices 16, and the driving components for the second heat medium flow switching devices) can be retained within the heat medium relay unit 3. Furthermore, the heat pump device 100 can achieve energy conservation since the pipes 5 can be shortened. In addition, the heat pump device 100 allows for high constructability by reducing the number of connection pipes (i.e., the refrigerant pipes 4 or the pipes 5) between the outdoor unit 1 and the heat medium relay unit 3 or the indoor units 2.

Moreover, in the heat pump device 100, the heat medium relay unit 3 is provided with the connection port 51a and the connection port 51b so that a binary cycle can be formed, whereby a high-temperature second heat medium can be supplied while reliability and efficiency are ensured. Furthermore, with the combination of the heat medium relay unit 3 and the water heating unit 300, the heat pump device 100 is not only capable of performing a cooling operation and a heating operation simultaneously with two pipes, but can also perform a hot-water-supply operation with two pipes.

Embodiment 2

Figure 9:
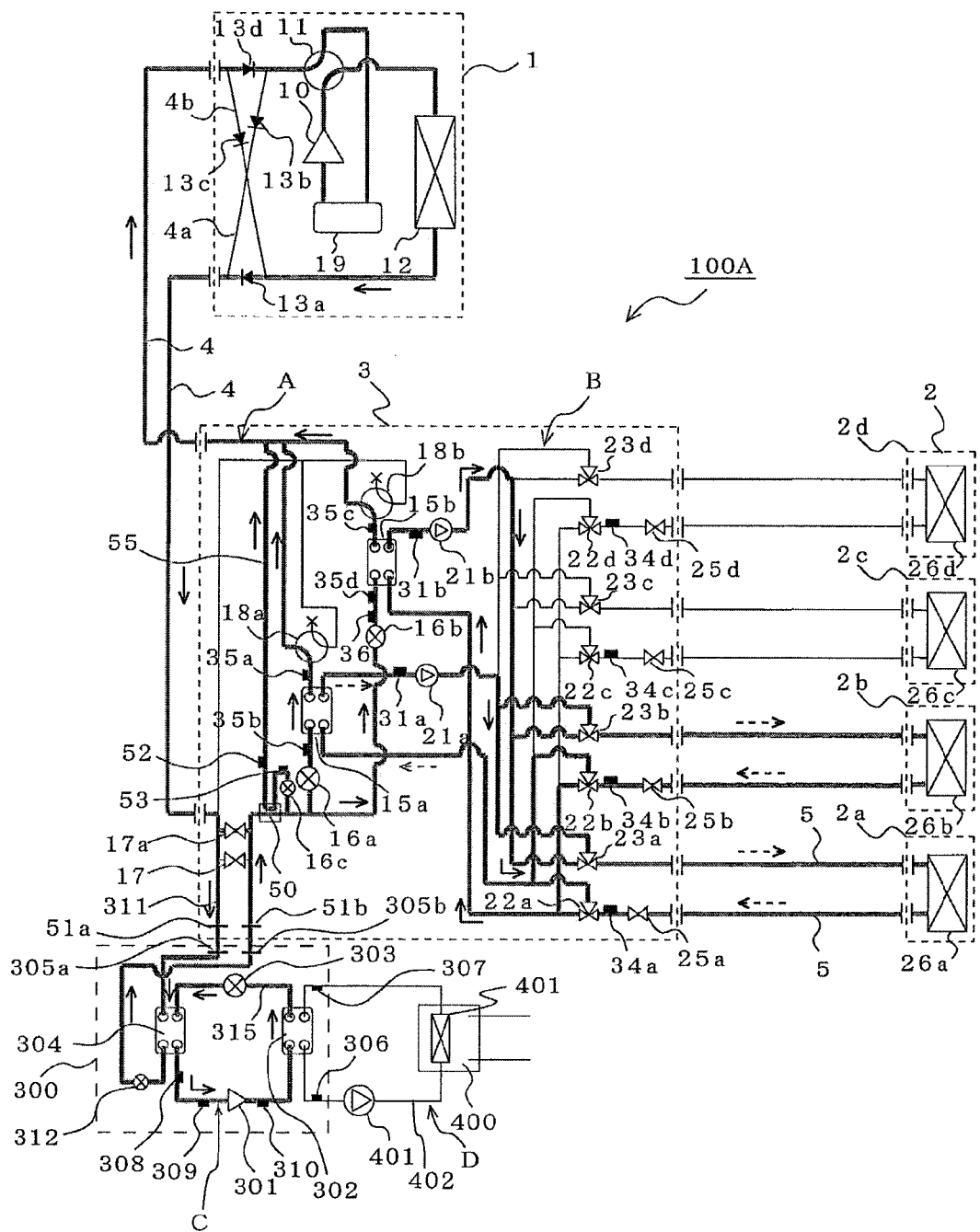
FIG. 9 is a schematic circuit configuration diagram showing an example of a circuit configuration of a heat pump device according to Embodiment 2 of the present invention.

FIG. 9 is a schematic circuit configuration diagram showing an example of a circuit configuration of a heat pump device (referred to as "heat pump device 100A" hereinafter) according to Embodiment 2 of the present invention. The circuit configuration of the heat pump device 100A will be described in detail with reference to FIG. 9. The heat pump device 100A differs from the heat pump device 100 according to Embodiment 1 in being provided with a second on-off device 17a in parallel to the on-off device 17. The remaining components in the heat pump device 100A are similar to those in the heat pump device 100 according to Embodiment 1. The following description of Embodiment 2 will mainly be focused on differences from Embodiment 1. Components that are the same as those in Embodiment 1 will be given the same reference numerals or characters, and descriptions thereof will be omitted. Furthermore, in FIG. 9, the flow of refrigerants in the aforementioned cooling only operation mode 2 is shown.

The on-off device 17a is constituted of a two-way valve or the like, and opens and closes the refrigerant pipe 4. The on-off device 17a is provided in the refrigerant pipe 4 at the inlet side for the heat-source-side refrigerant, specifically, in a pipe that connects the two refrigerant pipes 311. As shown in FIG. 9, the on-off device 17a and the on-off device 17 are provided in parallel to each other at an upper side and a lower side, respectively, in the drawing.

Furthermore, a resistance coefficient (i.e., Cv value) of the on-off device 17a is smaller than a resistance coefficient of the on-off device 17. In the heat pump device 100A, the on-off device 17 is set in a closed state and the on-off device 17a is set in an open state only when all of the indoor units 2 perform the cooling operation and the water heating unit 300 is in operation (i.e., in the aforementioned cooling only operation mode 2). In the other operation modes, that is, the cooling only operation mode 1, the cooling main operation mode, the heating main operation mode, and the heating only operation mode, the on-off device 17 is set in a closed state and the on-off device 17a is set in a closed state.

The reason for providing the on-off device 17a will now be described.

As described above in Embodiment 1, since the heat-source-side refrigerant entirely flows into the water heating unit 300 during the cooling only operation mode 2, in a case where the water heating unit 300 with a small capacity is connected to the heat medium relay unit 3, a pressure loss in the water heating unit 300 extremely increases, possibly causing problems in the operation. In view of this, the on-off device 17a is provided to make a portion of the heat-source-side refrigerant flow into the heat medium relay unit 3 so that the flow rate of the heat-source-side refrigerant flowing into the water heating unit 300 is reduced. The on-off device 17a may be of a type whose opening degree is adjustable.

[Cooling Only Operation Mode 2 (Pattern in which Water Heating Unit 300 is Driven)]

The cooling only operation mode 2 in FIG. 9 is directed to an example where cooling load is generated only in the use-side heat exchanger 26a and the use-side heat exchanger 26b, and the water heating unit 300 is in operation. In FIG. 9, pipes denoted by thick lines are pipes through which the refrigerants (i.e., the heat-source-side refrigerant and the water-heating-unit-side refrigerant) and the first heat medium flow. Furthermore, in FIG. 9, the flowing direction of the heat-sourceside refrigerant and the water-heating-unit-side refrigerant is denoted by solid arrows, whereas the flowing direction of the first heat medium is denoted by dashed arrows. Descriptions of the other operation modes will be omitted here since everything is the same except for the on-off device 17 and the on-off device 17a.

In the cooling only operation mode 2 shown in FIG. 9, in the outdoor unit 1, the first refrigerant flow switching device 11 is switched so as to cause the heat-source-side refrigerant discharged from the compressor 10 to flow into the heat-source-side heat exchanger 12. In the heat medium relay unit 3, the pump 21a and the pump 21b are driven, the heat medium flow control device 25a and the heat medium flow control device 25b are opened, the heat medium flow control device 25c and the heat medium flow control device 25d are completely closed, and the first heat medium is made to circulate between each of the heat exchangers 15a and 15b related to heat medium and the use-side heat exchangers 26a and 26b. Furthermore, in the heat medium relay unit 3, the on-off device 17 is set in a closed state, whereas the on-off device 17a is set in an open state. The control mode of the outdoor unit 1 is the same as that in the cooling main operation mode. Furthermore, in the water heating unit 300, the compressor 301 is driven so that the water-heating-unit-side refrigerant is made to circulate through the refrigerant circuit C, and the expansion device 312 is set in an open state.

First, the flow of the heat-source-side refrigerant in the refrigerant circuit A will be described.

A low-temperature low-pressure refrigerant is compressed by the compressor 10 so that a high-temperature high-pressure gas refrigerant is discharged therefrom. The high-temperature high-pressure gas refrigerant discharged from the compressor 10 flows into the heat-source-side heat exchanger 12 via the first refrigerant flow switching device 11. Then, the high-temperature high-pressure gas refrigerant condenses and liquefies at the heat-source-side heat exchanger 12 while transferring heat to outdoor air, thereby becoming a high-pressure two-phase gas-liquid refrigerant. The high-pressure two-phase refrigerant flowing out from the heat-source-side heat exchanger 12 travels through the check valve 13a so as to flow out from the outdoor unit 1, and then travels through the refrigerant pipe 4 so as to flow into the heat medium relay unit 3.

A portion of the high-pressure two-phase refrigerant flowing into the heat medium relay unit 3 flows into the water heating unit 300, whereas the remaining portion travels through the on-off device 17a, merges with the high-pressure liquid refrigerant flowing out from the water heating unit 300, and then flows into the subcooling heat exchanger 50. The heat-source-side refrigerant flowing into the subcooling heat exchanger 50 exchanges heat with the heat-source-side refrigerant flowing through the bypass 55, thereby becoming a high-pressure liquid refrigerant. A portion of this high-pressure liquid refrigerant flows into the bypass 55, whereas the remaining portion flows into the expansion device 16a and the expansion device 16b. The high-pressure liquid refrigerant flowing into the bypass 55 is expanded by the expansion device 16c so as to become a low-pressure two-phase refrigerant, which then flows toward the bypass 55 side of the subcooling heat exchanger 50. The low-pressure two-phase refrigerant flowing into the bypass 55 side of the subcooling heat exchanger 50 exchanges heat with the high-pressure refrigerant so as to become low gas refrigerant, which then flows into the low-pressure pipe. The high-pressure liquid refrigerant flowing into the expansion device 16a and the expansion device 16b is expanded by the expansion device 16a and the expansion device 16b, thereby becoming a low-temperature low-pressure two-phase refrigerant.

On the other hand, the high-pressure two-phase refrigerant flowing into the water heating unit 300 flows into the heat-source-side refrigerant passage in the heat exchanger 304. The high-pressure two-phase refrigerant then condenses by exchanging heat with the water-heating-unit-side refrigerant, and is subsequently expanded by the expansion device 312. Then, the refrigerant flows out from the water heating unit 300 and flows into the heat medium relay unit 3 so as to merge with the heat-source-side refrigerant flowing via the on-off device 17a.

The low-temperature low-pressure two-phase refrigerant flowing out from the expansion device 16a and the expansion device 16b flows into the heat exchanger 15a related to heat medium and the heat exchanger 15b related to heat medium functioning as evaporators and receives heat from the first heat medium circulating through the heat medium circuit B so as to become a low-temperature low-pressure gas refrigerant while cooling the first heat medium. The gas refrigerant flowing out from the heat exchanger 15a related to heat medium and the heat exchanger 15b related to heat medium travels through the second refrigerant flow switching device 18a and the second refrigerant flow switching device 18b and subsequently merges with the low-pressure gas refrigerant flowing from the bypass 55. The merged refrigerant flows out from the heat medium relay unit 3 and travels through the refrigerant pipe 4 so as to flow back into the outdoor unit 1. The refrigerant flowing into the outdoor unit 1 travels through the check valve 13d and is suctioned into the compressor 10 again via the first refrigerant flow switching device 11 and the accumulator 19.

In this case, the opening degree of the expansion device 16a is controlled such that the degree of superheat obtained as a difference between the temperature detected by the third temperature sensor 35a and the temperature detected by the third temperature sensor 35b is made constant. Similarly, the opening degree of the expansion device 16b is controlled such that the degree of superheat obtained as a difference between the temperature detected by the third temperature sensor 35c and the temperature detected by the third temperature sensor 35d is made constant. The opening degree of the expansion device 16c is controlled such that the degree of superheat obtained as a difference between the temperature detected by the fourth temperature sensor 52 and the temperature detected by the fifth temperature sensor 53 is made constant. The expansion device 16c is set in an open state, and the on-off device 17 is set in a closed state.

Next, the flow of the water-heating-unit-side refrigerant in the refrigerant circuit C will be described.

The water-heating-unit-side refrigerant compressed by the compressor 301 becomes a high-temperature high-pressure gas refrigerant, which then flows into the water-heating-unit-side refrigerant passage in the heat exchanger 302. In the heat exchanger 302, the water-heating-unit-side refrigerant exchanges heat with the second heat medium (e.g., hot water) returning from the hot-water storage tank 400 so that the second heat medium is heated to a high temperature and the water-heating-unit-side refrigerant is decreased in temperature (by enthalpy), and then flows out from the heat exchanger 302.

The water-heating-unit-side refrigerant flowing out from the heat exchanger 302 is decompressed by the expansion device 303 so as to become a low-pressure two-phase refrigerant, which then flows into the water-heating-unit-side refrigerant passage in the heat exchanger 304. The water-heating-unit-side refrigerant flowing into the heat exchanger 304 exchanges heat with the heat-source-side refrigerant flowing from the heat medium relay unit 3 via the connection port 51a and the connection port 305a. Then, the heat-source-side refrigerant condenses into a liquid state, whereas the water-heating-unit-side refrigerant evaporates into a gaseous state. The heat-source-side refrigerant condensed into the liquid state is decompressed by the expansion device 312 and is transported to the heat medium relay unit 3 via the connection port 305b and the connection port 51b. The water-heating-unit-side refrigerant in the gaseous state is suctioned into the compressor 301 again.

Since the flow of the first heat medium in the heat medium circuit B is similar to that in the cooling only operation mode 1 shown in FIG. 4, a description thereof will be omitted here.

Accordingly, the heat pump device 100A according to Embodiment 2 not only achieves improved safety by not making the heat-source-side refrigerant circulate to the indoor units 2 or the vicinity of the indoor units 2, but also achieves further improved safety since the heat medium leaking from connection sections between the pipes 5 and the actuators can be retained within the heat medium relay unit 3. Furthermore, the heat pump device 100A can achieve energy conservation since the pipes 5 can be shortened. In addition, the heat pump device 100A allows for high constructability by reducing the number of connection pipes (i.e., the refrigerant pipes 4 or the pipes 5) between the outdoor unit 1 and the heat medium relay unit 3 or the indoor units 2.

Moreover, in the heat pump device 100A, the heat medium relay unit 3 is provided with the connection port 51a and the connection port 51b so that a binary cycle can be formed, whereby a high-temperature second heat medium can be supplied while reliability and efficiency are ensured. Furthermore, with the combination of the heat medium relay unit 3 and the water heating unit 300, the heat pump device 100A is not only capable of performing a cooling operation and a heating operation simultaneously with two pipes, but can also perform a hot-water-supply operation with two pipes. In addition, by connecting the on-off device 17a having a resistance coefficient smaller than that of the on-off device 17 in parallel to the on-off device 17, a pressure loss in the water heating unit 300 can be reduced, thereby further contributing to high performance.

REFERENCE SIGNS LIST 1 outdoor unit, 2 indoor units, 2a indoor unit, 2b indoor unit, 2c indoor unit, 2d indoor unit, 3 heat medium relay unit, 4 refrigerant pipes, 4a first connection pipe, 4b second connection pipe, 5 pipes, 6 outdoor space, 7 indoor space, 8 space, 9 architectural structure, 10 compressor, first refrigerant flow switching device, 12 heat-source-side heat exchanger, 13a check valve, 13b check valve, 13c check valve, 13d check valve, 15 heat exchangers related to heat medium, 15a heat exchanger related to heat medium, 15b heat exchanger related to heat medium, 16 expansion devices, 16a expansion device, 16b expansion device, 16c expansion device, 17 on-off device, 17a on-off device, 18 second refrigerant flow switching devices, 18a second refrigerant flow switching device, 18b second refrigerant flow switching device, 19 accumulator, 21 pumps, 21a pump, 21b pump, 22 first heat medium flow switching devices, 22a first heat medium flow switching device, 22b first heat medium flow switching device, 22c first heat medium flow switching device, 22d first heat medium flow switching device, 23 second heat medium flow switching devices, 23a second heat medium flow switching device, 23b second heat medium flow switching device, 23 second heat medium flow switching device, 23d second heat medium flow switching device, 25 heat medium flow control devices, 25a heat medium flow control device, 25b heat medium flow control device, 25c heat medium flow control device, 25d heat medium flow control device, 26 use-side heat exchangers, 26a use-side heat exchanger, 26b use-side heat exchanger, 26c use-side heat exchanger, 26d use-side heat exchanger, 31 first temperature sensors, 31a first temperature sensor, 31b first temperature sensor, 34 second temperature sensors, 34a second temperature sensor, 34b second temperature sensor, 34c second temperature sensor, 34d second temperature sensor, 35 third temperature sensors, 35a third temperature sensor, 35b third temperature sensor, 35c third temperature sensor, 35d third temperature sensor, 36 first pressure sensor, 50 subcooling heat exchanger, 51a connection port, 51b connection port, 52 fourth temperature sensor, 53 fifth temperature sensor, 55 bypass, 60 mechanical room, 100 heat pump device, 100A heat pump device, 300 water heating unit, 301 compressor, 302 heat exchanger, 303 expansion device, 304 heat exchanger, 305a connection port, 305b connection port, 306 sixth temperature sensor, 307 seventh temperature sensor, 308 eighth temperature sensor, 309 second pressure sensor, 310 third pressure sensor, 311 refrigerant pipes, 312 expansion device, 315 refrigerant pipes, 400 hot-water storage tank, 401 water transport unit, 402 pipes, 410 heat exchanger, A refrigerant circuit, B heat medium circuit, C refrigerant circuit, D hot-water storage circuit.

The invention claimed is:

1. A heat pump device comprising:
a first refrigerant circuit that makes a first refrigerant circulate therethrough by connecting a first compressor, a heat-source-side heat exchanger, a first expansion device, a first on-off device, and a refrigerant-side passage in a heat exchanger related to heat medium with refrigerant pipes;
a first heat medium circuit that makes a first heat medium circulate therethrough by connecting a pump, a use-side heat exchanger, a heat-medium-side passage in the heat exchanger related to heat medium with heat medium pipes;
a second refrigerant circuit that makes a second refrigerant circulate therethrough by connecting a second compressor, a first heat exchanger, a second expansion device, and a second heat exchanger with refrigerant pipes; and
a second heat medium circuit that makes a second heat medium circulate therethrough, the second heat medium exchanging heat with the second refrigerant via the first heat exchanger,
wherein the first compressor and the heat-source-side heat exchanger are included in an outdoor unit,
wherein the first expansion device, the first on-off device, the heat exchanger related to heat medium, and the pump are included in a heat medium relay unit,
wherein the use-side heat exchanger is included in an indoor unit,
wherein the second compressor, the first heat exchanger, the second expansion device, and the second heat exchanger are included in a water heating unit,
wherein the first refrigerant circuit and the second refrigerant circuit are connected to each other via the second heat exchanger included in the water heating unit, and the first heat exchanger is capable to heat the second heat medium,
wherein a third expansion device is provided at an outlet side for the heat-source-side refrigerant of the second heat exchanger included in the water heating unit; and
wherein inflow of the heat-source-side refrigerant toward the water heating unit is controlled based on an opening degree of the third expansion device.

2. The heat pump device of claim 1,
wherein the heat medium relay unit and the water heating unit are each provided with two connection ports connectable to the corresponding refrigerant pipes of the refrigerant pipes constituting the first refrigerant circuit, and
wherein the two connection ports provided in the heat medium relay unit are formed so as to be connectable to pipes through which a high-pressure refrigerant flows, the pipes being included in the refrigerant pipes constituting the first refrigerant circuit.

3. The heat pump device of claim 2,
wherein the first on-off device is installed in a pipe that connects the pipes extending to the two connection ports provided in the heat medium relay unit.

4. The heat pump device of claim 3,
wherein a second on-off device is provided in parallel to the first on-off device.

5. The heat pump device of claim 1, wherein a plurality of the first expansion devices and a plurality of the heat exchangers related to heat medium are provided,
wherein a plurality of second refrigerant flow switching devices that switch a circulation passage for the first refrigerant are installed,
wherein
a heating only operation mode in which the first heat medium is heated in all of the plurality of heat exchangers related to heat medium,
a cooling only operation mode in which the first heat medium is cooled in all of the plurality of heat exchangers related to heat medium, and
a cooling and heating mixed operation mode in which the first heat medium is heated in one or more of the plurality of heat exchangers related to heat medium and the first heat medium is cooled in one or more of the remaining heat exchanger or heat exchangers related to heat medium are switchable by the second refrigerant flow switching devices.

6. The heat pump device of claim 1, wherein the outdoor unit and the heat medium relay unit are connected to each other by two pipes, the heat medium relay unit and the indoor unit are connected to each other by two pipes, and the heat medium relay unit and the water heating unit are connected to each other with two pipes.

7. The heat pump device of claim 1, wherein the first refrigerant used is a refrigerant different from the second refrigerant.

8. The heat pump device of claim 7, wherein the second refrigerant used is a refrigerant with about the same pressure as R134a.

9. The heat pump device of claim 8, wherein a refrigerant composed of HFO-1234yf or HFO-1234ze is used as the second refrigerant.

* * * * *